(12) United States Patent
Iwata et al.

(10) Patent No.: US 6,435,377 B1
(45) Date of Patent: Aug. 20, 2002

(54) FROZEN DESSERT DISPENSER

(75) Inventors: Tsutomu Iwata, Yakumo-mura; Shinji Notsu, Ohara-gun; Michiharu Ishihara, Ohara-gun; Hironori Rikiishi, Ohara-gun, all of (JP)

(73) Assignee: Hoshizaki Denki Co., Ltd., Aichi (JP)

( * ) Notice: Subject to any disclaimer, the term of this patent is extended or adjusted under 35 U.S.C. 154(b) by 0 days.

(21) Appl. No.: 09/407,943

(22) Filed: Sep. 29, 1999

(30) Foreign Application Priority Data

Nov. 2, 1998 (JP) .......................................... 10-312357

(51) Int. Cl.$^7$ ............................................. B60D 83/00
(52) U.S. Cl. ...................... 222/397; 222/146.6; 222/389
(58) Field of Search ............................... 222/318, 389, 222/146.6, 638, 95, 105, 397; 60/447, 432; 91/441, 468, 392

(56) References Cited

U.S. PATENT DOCUMENTS

| | | | | |
|---|---|---|---|---|
| 2,558,887 A | * | 7/1951 | Tesiero | |
| 5,048,724 A | * | 9/1991 | Thomas | 222/95 |
| 5,096,093 A | * | 3/1992 | Wells | 222/95 |
| 5,150,820 A | * | 9/1992 | McGill | 222/95 |
| 5,265,764 A | * | 11/1993 | Rowe et al. | 222/95 |
| 5,421,484 A | * | 6/1995 | Beach | 222/95 |
| 5,492,249 A | * | 2/1996 | Beach | 222/105 |
| 5,680,761 A | * | 10/1997 | Hada et al. | 60/432 |
| 5,779,098 A | * | 7/1998 | Fancher | 222/146.6 |

FOREIGN PATENT DOCUMENTS

| | | |
|---|---|---|
| JP | 3-297354 | 12/1991 |
| JP | 63-263051 | 10/1998 |

* cited by examiner

*Primary Examiner*—David A. Scherbel
*Assistant Examiner*—Christopher S. Kim
(74) *Attorney, Agent, or Firm*—Wenderoth, Lind & Ponack, L.L.P.

(57) ABSTRACT

A frozen dessert dispenser includes a heat-insulating box, a cooling unit for cooling an atmosphere in the heat-insulating box, a dispensing cylinder including a piston ascended and descended by an operating fluid and a pack accommodating chamber in which a frozen dessert pack is accommodated, a pump supplying and discharging the operating fluid to and from a pressure chamber defined in the dispensing cylinder, and a usually closed operating fluid introducing port disposed in the cylinder. The operating fluid introducing port is opened so that the operating fluid is introduced into the pressure chamber, when the piston reaches a bottom dead point.

4 Claims, 31 Drawing Sheets

FIG. 2
(A)
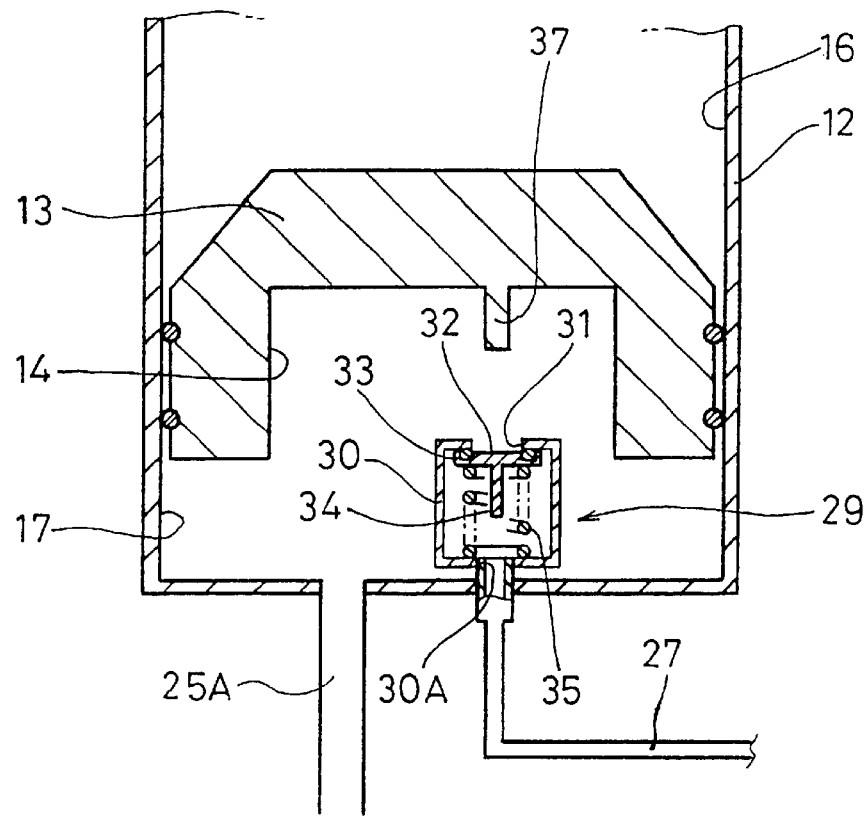
(B)
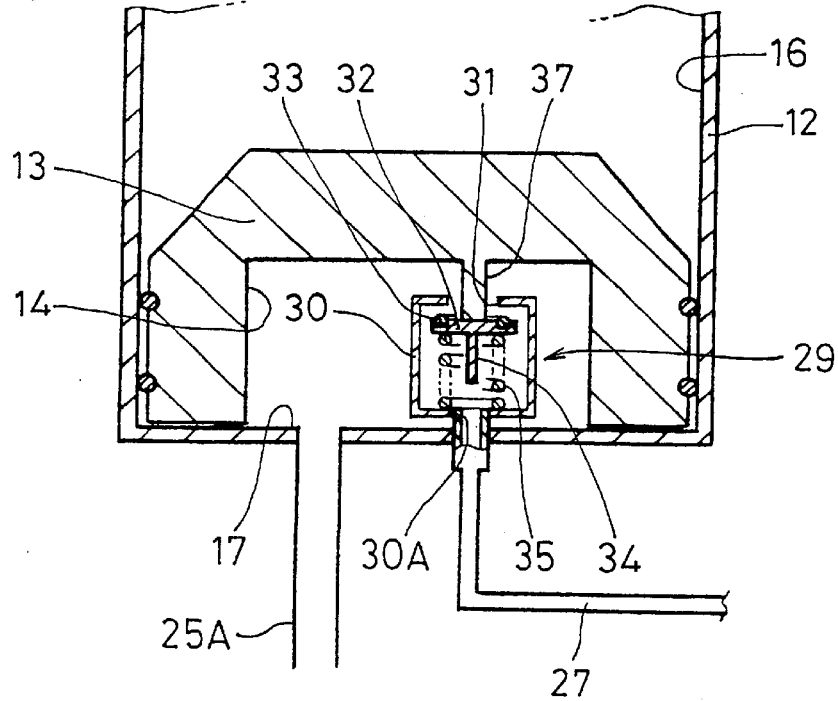

FIG. 25
(A)
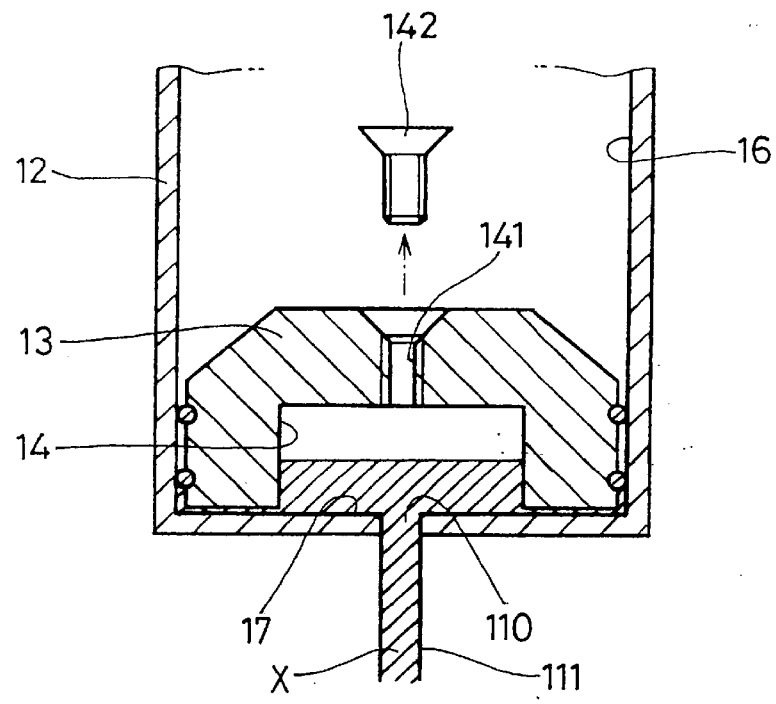
(B)
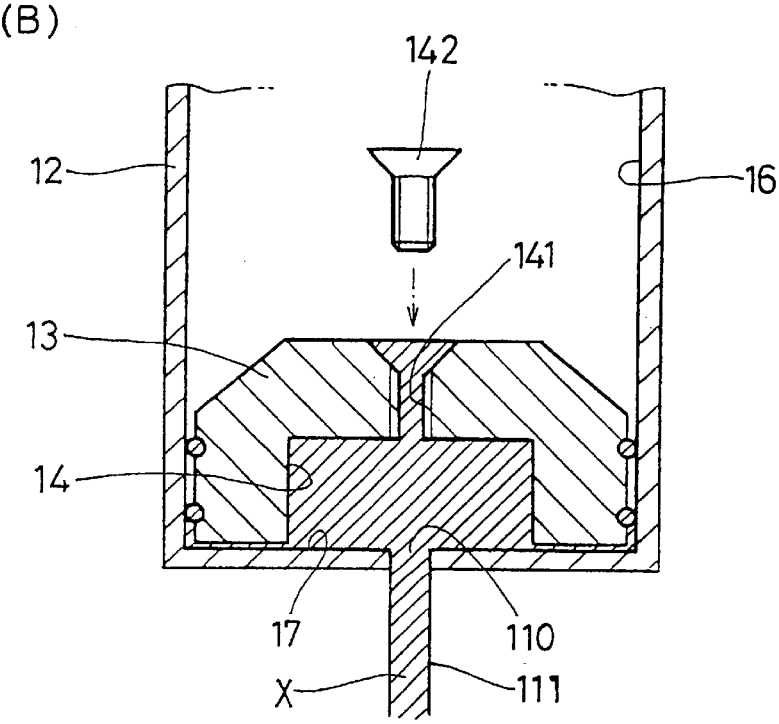

FROZEN DESSERT DISPENSER

BACKGROUND OF THE INVENTION

1. Field of the Invention

This invention relates generally to a frozen dessert dispenser in which a pack containing a frozen dessert such as ice cream or frozen yogurt and accommodated in a dispensing cylinder is pressurized by a pistons thereby dispensing the frozen dessert, and more particularly to an improvement in a driving mechanism for driving the piston in such a frozen dessert dispenser.

2. Description of the Prior Art

International Publication No. WO 90/05697 discloses one of the frozen dessert dispensers of the above-described type. In the disclosed dispenser, a cylinder is provided in a heat-insulating box in a vertical disposition. An atmosphere in the heat-insulating box is cooled by a cooling unit. A packed frozen dessert such as a packed ice cream is accommodated in the cylinder. The pack is compressed by a piston driven by a fluid pressure so that the ice cream in the pack is dispensed through a communicating pipe out of the heat-insulating box. In this construction, a refrigerant such as brine is used as an operating fluid as well as air. A pump is driven to supply the refrigerant into a pressure chamber of the cylinder and to suck the refrigerant out of the pressure chamber.

When all of the frozen dessert is dispensed out of the pack, the pump is driven in a reverse direction to suck the operating fluid so that a piston is descended. As a result, the capacity of a pack accommodating chamber in the cylinder is increased so that the pack is replaced by a new one. In replacement of the pack, the operator conventionally confirms the piston assuming a bottom dead point by visual inspection and then stops the pump. However, since there is a time lag between the reach of the piston to the bottom dead point and the stop of the pump, the sucking operation is continued a moment after the piston has descended to the bottom dead point. This reduces the pressure in the pressure chamber of the cylinder to a large extent. As a result, the pump is overloaded such that the service life thereof is shortened or an offensive noise is produced.

When the frozen dessert dispenser in which a liquid such as brine is used as the operating fluid is operated for the first time after installation, the pump is driven so that the operating liquid is supplied from a brine tank disposed in a freezing compartment into the cylinder. In this case, air is sometimes confined or cooped in a pipe at the discharge side of the pump or in the interior of the cylinder below the underside of the piston. Further, in a case where a sealing member used in the piston is deteriorated during an ordinary operation, air sometimes leaks from the interior of the cylinder over the top of the piston to the interior of the cylinder below the underside of the piston when the operating fluid is sucked so that the piston is descended. As a result, the leaked air is sometimes mixed into the operating fluid in the interior of the cylinder below the underside of the piston. When the operating fluid is pressurized in the pressure chamber in the above-described condition, the air below the piston is also pressurized. Since air is a compressive fluid, the air is first compressed to the limit thereof and thereafter, the piston is pressurized by the operating fluid to be ascended. This renders the movement of the piston unstable. This problem cannot easily be coped with when a driving time of the pump is controlled for the dispensing of a constant amount of frozen dessert, for example.

SUMMARY OF THE INVENTION

Therefore, an object of the present invention is to provide a frozen dessert dispenser in which the pump can be prevented from being driven notwithstanding reach of the piston to a limit position when the piston is descended, whereupon the pressure chamber of the cylinder can be prevented from being excessively decompressed.

Another object of the invention is to provide a frozen dessert dispenser in which an adverse effect by the air mixed with the operating liquid can be eliminated so that the piston can stably be driven.

Further another object of the invention is to provide a frozen dessert dispenser which can prevent the frozen dessert and/or the operating fluid from scattering outside the dispenser when a lid of the cylinder is incompletely closed or the operating fluid leaks out of a supply passage thereof in a case where the dispenser is inadvertently manipulated for the dispensing operation with a door of the heat-insulating box being open.

The present invention provides a frozen desert dispenser comprising a heat-insulating box having a side formed with an opening closed and opened by a heat-insulating door, a cooling unit for cooling an atmosphere in the heat-insulating box, a dispensing cylinder formed into the shape of a vessel and having an open end, the cylinder including a lid for closing and opening the open end thereof and a piston provided therein for sliding motion, the cylinder including a pack accommodating chamber defined between the piston and the lid therein so that a frozen dessert pack is accommodated into the pack accommodating chamber when the lid is opened, a pump supplying and discharging an operating fluid to and from a pressure chamber defined in the dispensing cylinder, the pressure chamber being located in a space opposite the pack accommodating chamber with respect to the piston, and a usually closed operating fluid introducing port provided in the cylinder, the operating fluid introducing port being opened so that the operating fluid is introduced therethrough into the pressure chamber, when the piston reaches a bottom dead point.

According to the above-described construction, when the piston reaches the bottom dead point thereof, the operating fluid introducing port is opened so that the operating fluid is introduced into the pressure chamber in the dispensing cylinder. Consequently, the interior of the pressure chamber can be prevented from being subjected to an excessive negative pressure.

In one preferred form, the frozen dessert dispenser further comprises an auxiliary passage connecting the pressure chamber of the dispensing cylinder and a brine tank to each other, a check valve provided in the auxiliary passage so as to allow the operating liquid to flow from the brine tank to pressure chamber and so as to prevent a reverse flow of the operating fluid, and a valve provided in the auxiliary passage to be in series to the check valve, the valve being opened when the piston reaches a bottom dead point, the valve being closed otherwise.

In this construction, when the piston reaches the bottom dead point thereof, the valve is opened so that the operating liquid in the brine tank is caused to flow via the check valve into the pressure chamber. Consequently, the interior of the pressure chamber can reliably be prevented from being subjected to the excessive negative pressure. Thereafter, when the pump is driven to increase the pressure in the pressure chamber, the check valve shuts off the flow of the operating liquid from the pressure chamber toward the brine tank, whereby the piston can immediately be ascended.

In another preferred form, the frozen dessert dispenser further comprises an air removing element which removes air from the pressure chamber. Air is removed from the operating liquid supplied into the pressure chamber. Consequently, the piston can smoothly be moved when the operating liquid is pressurized. The air removing element may include an air removing pipe connecting the brine tank and a backside of the piston when the piston reaches a bottom dead point thereof, and a valve or a throttle valve each provided in the air removing pipe. Further, the air removing element may include an air removing pipe extending through opposed sides of the piston, and the air removing pipe may usually be closed by a cock detachably attached thereto.

A brine tank for reserving the operating fluid is preferably provided in the heat-insulating box to be away from a bottom of the heat-insulating box so that a passage for a cooling air is defined between the brine tank and the bottom of the heat-insulating box. Moreover, the brine tank is preferably further provided to be away from a rear fade of the heat-insulating box so that a passage for the cooling air is defined therebetween. Consequently, the operating liquid is sufficiently cooled such that the frozen dessert can be prevented from being heated when the operating liquid is supplied into the dispensing cylinder.

BRIEF DESCRIPTION OF THE DRAWINGS

Other objects, features and advantages of the present invention will become clear upon reviewing the following description of the preferred embodiments made with reference to the accompanying drawings, in which:

FIGS. 2A and 2B are partial sectional views of a valve, showing an operation thereof;

FIGS. 25A and 25B are partial sectional views of the dispensing cylinder employed in the ice cream dispenser of a sixteenth embodiment in accordance with the invention;

DETAILED DESCRIPTION OF THE PREFERRED EMBODIMENTS

Figure 1:
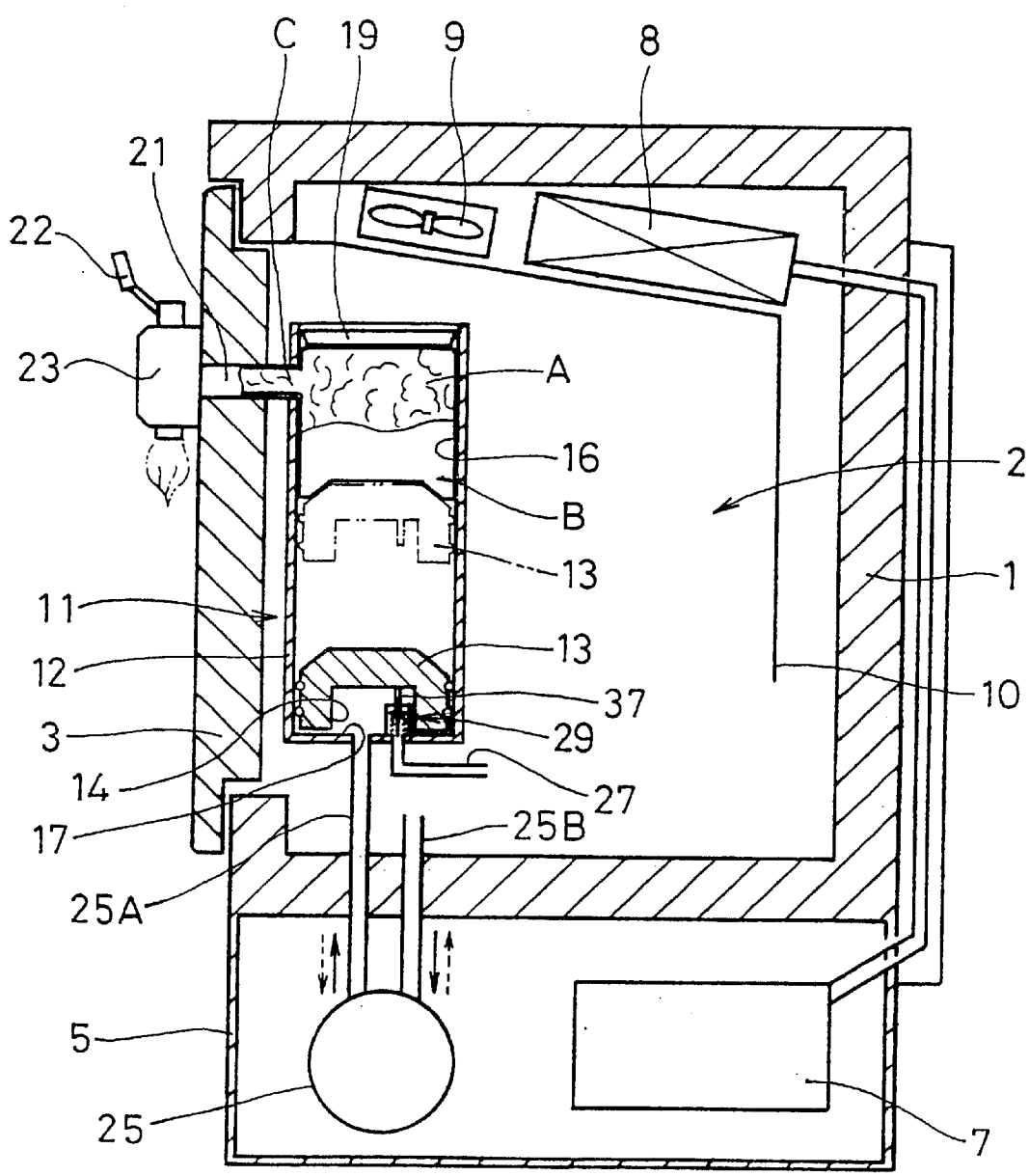
FIG. 1 is a longitudinal sectional side view of an ice cream dispenser of a first embodiment in accordance with the present invention.

The present invention will be described by way of several embodiments in each of which the invention is applied to an ice cream dispenser. FIGS. 1 and 2 illustrate the ice cream dispenser of a first embodiment. Referring to FIG. 1, reference numeral 1 designates a vertically long heat-insulating box constituting a freezer. A freezing compartment 2 is defined in an interior of the heat-insulating box 1. The heat-insulating box 1 has a front opening closed and opened by a heat-insulating door 3 hingedly mounted thereon. A machine compartment 5 is provided at the bottom side of the heat-insulating box 1. An evaporator 8 connected to a refrigerating unit 7 provided in the machine compartment 5 and an interior fan 9 are provided on a ceiling of the freezing compartment 2. Air in the freezing compartment 2 is sucked in through a duct 10 provided on the rear of the freezing compartment and supplied to the evaporator 8 for heat exchange. The air is changed to cold air while passing through the evaporator, and the cold air is circulated by the fan 9 into the freezing compartment 2. The evaporator 8 is connected to the refrigerating unit 7 including a compressor, a condenser, etc. provided in the machine compartment 5 so that a well-known refrigeration cycle is constituted. A temperature in the freezing compartment 2 is maintained at such a value that ice cream can be reserved while being able to be dispensed.

A dispensing cylinder 11 made of a stainless steel is mounted in a front interior of the freezing compartment 2 in a vertical disposition. A piston 13 is fitted in the dispensing cylinder 11 so as to be slid therein. Air is used as an operating fluid. The piston 13 has a cut-off recess 14 formed in the backside thereof. The interior of the dispensing cylinder 11 at an upper side of the piston 13 is defined as a pack accommodating chamber 16. A pack B filled with ice cream A is flexible. A pressure chamber 17 is defined in the interior of the dispensing cylinder 11 at the backside of the piston 13. The operating fluid is supplied into and discharged from the pressure chamber 17.

The pack accommodating chamber 16 has an upper open end to which a cap 19 is detachably attached. A dispensing pipe 21 horizontally extends through the heat-insulating door 3. The dispensing pipe 21 has an inner end connected to a supply opening C of the pack B. The dispensing pipe 21 further has an outer protruding end provided with a dispensing section 23 including a dispensing cock 22.

An air compressor or a reversible pump 25 is provided in the machine compartment 5. The pump 25 includes a discharge pipe 25A connected to a bottom of the pressure chamber 17 of the dispensing cylinder 11. The pump 25 further includes a suction pipe 25B open to the interior of the freezing compartment 2. When the pump 25 is driven in a normal direction, air in the freezing compartment 2 is sucked in to be supplied as an operating air into the pressure chamber 17. On the other hand, when the pump 25 is driven in a reverse directions the operating air in the pressure chamber 17 is sucked in to be returned into the freezing compartment 2.

The bottom of the pressure chamber 17 is provided with an air introducing pipe 27 as shown in FIG. 2. The air introducing pipe 27 has a lower end bent horizontally. A valve 29 is connected to an upwardly protruding end of the pipe 27. The valve 29 includes a casing 30 having a central hole 30A formed through a bottom thereof. The upper end of the pipe 27 is fitted in the hole 30A of the casing 30. The casing 30 further has a central circular valve opening 31 formed in a top thereof. A disc-shaped valve element 32 is accommodated in the casing 30 so as to be brought into contact with and departed from the valve opening 31 so that the valve opening is closed and opened. An O-ring 33 is mounted on an upper face of the valve element 32. A compression coil spring 35 is provided around a shaft 34 extending from a backside thereof to be located between the bottom of the casing 30 and the backside of the valve element 32. The spring 35 applies a spring force to the valve element 32 so that the valve element usually closes the valve opening 31 as shown in FIG. 2A.

A rod 37 projects downward from a ceiling of the recess 14 of the piston 13 so as to correspond to the valve 29. The rod 37 is inserted through the valve opening 31 to depress the valve element 32 when the piston 13 is operated. The rod 37 has such a length as to depress the valve element 32 upon reach of the piston 13 to the bottom of the pressure chamber 17 so that the valve opening 31 is opened as shown in FIG. 2B.

The operation of the ice cream dispenser will now be described. The pack B containing the ice cream A is accommodated in the pack accommodating chamber 16 of the dispensing cylinder 11. When the ice cream A is to be dispensed, the dispensing cock 22 is opened and a dispensing switch (not shown) is turned on. As a result, the pump 25 is driven in the normal direction so that air in the freezing compartment 2 is sucked in to be supplied as the operating air into the pressure chamber 17 as shown by solid line arrows in FIG. 1. The operating air ascends the piston 13 so that the pack B is compressed, whereupon the ice cream A is dispensed from the pack B. When a suitable amount of ice cream A is dispensed, the dispensing cock 22 is closed and the dispensing switch is turned off. As a result, the pump 25 is stopped so that the dispensing operation is also stopped. The above-described operation is repeated so that the ice cream A is dispensed.

When the ice cream A contained in the pack B has been used up, the pack B is replaced by a new one. Prior to the replacement, the piston 13 assuming an upper end position is descended so that the capacity of the pack accommodating chamber 16 is increased. For this purpose, a pack replacing switch (not shown) is turned on so that the pump 25 is driven in a reverse direction. As a result, the operating air in the pressure chamber 17 is sucked in to be returned into the freezing compartment 2 as shown by broken line arrows in FIG. 1. Since the pressure in the pressure chamber 17 is rendered negative, the piston 13 is descended such that the capacity of the pack accommodating chamber 16 is increased, as shown in FIG. 2A. When the piston is descended to thereby assume a lower end position as shown in FIG. 2B, the rod 37 depresses the valve element 32 of the valve 29 against the spring force of the compression coil spring 35, whereupon the valve opening 31 is opened.

The pump 25 is stopped when the piston 13 reaches the lower end position. Even when the stopping operation is delayed such that the air sucking operation is continued, the valve opening 31 of the valve 29 is opened. Consequently, since air in the freezing compartment 2 is supplied through the air introducing pipe 27 and the valve opening 31 into the space at the backside of the piston 13, the pressure in the pressure chamber 17 is prevented from being rendered excessively negative.

When the descending of the piston 13 is completed, the cap 19 is detached and the used pack B is taken out of the pack accommodating chamber 16. A new pack B is then accommodated into the chamber 16. When the operating air is supplied into the pressure chamber 17 upon the dispensing operation such that the piston 13 is ascended by a predetermined distance, the valve opening 31 of the valve 29 is closed.

According to the above-described embodiment, the piston 13 is descended so that the capacity of the pack accommodating chamber 16 is increased. Even when the air sucking operation by the pump 25 is continued for the pressure chamber 17 after the operation for descending the piston 13 is carried out such that the piston 13 assumes the lower end position, the operating air is supplied through the air introducing pipe 27 into the pressure chamber 17 so that the pressure in the pressure chamber 17 is prevented from being rendered excessively negative. Consequently, the pump 25 can be prevented from being overloaded and a noise can be prevented from being produced.

Figure 3:
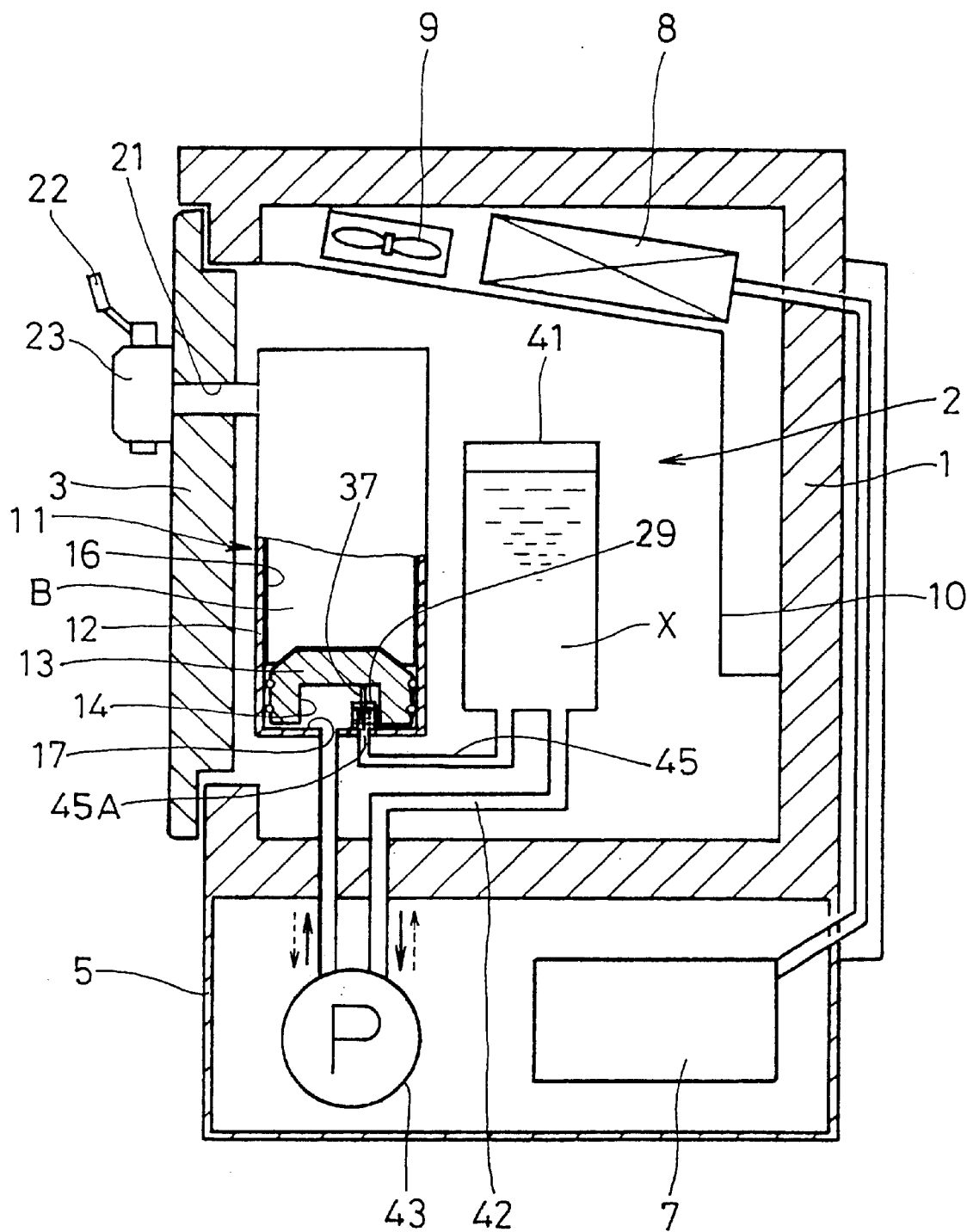
FIG. 3 is a longitudinal sectional view of the ice cream dispenser of a second embodiment in accordance with the invention.

FIG. 3 illustrates a second embodiment. In the second embodiment, a brine X (antifreezing solution) is used as the operating fluid. For this purpose, a brine tank 41 for reserving the brine X is provided in the freezing compartment 2. A brine passage 42 connects the brine tank 41 and the bottom of the pressure chamber 17 of the dispensing cylinder 11 to each other. A reversible pump 43 is provided in the middle of the brine passage 42. When the pump 43 is driven in the normal direction, the brine X in the brine tank 41 is supplied into the pressure chamber 17. The piston 13 is ascended to compress the pack B so that the ice cream A in the pack is dispensed. In replacement of the pack B, the pump 43 is driven in the reverse direction such that the brine X in the pressure chamber 17 is sucked in to be returned into the brine tank 41. As a result, when the pressure in the pressure chamber 17 is rendered negative, the piston 13 is descended so that the capacity of the pack accommodating chamber 16 is increased.

In the second embodiment, a brine introducing pipe 45 extends from the bottom of the pressure chamber 17 to be connected to the bottom of the brine tank 41. The valve 29 is connected to the side of an outlet 45A in the same manner as in the first embodiment. The rod 37 for opening the valve also protrudes from the ceiling of the recess 14 of the piston 13 in the same manner as in the foregoing embodiment.

According to the second embodiment, the brine X in the brine tank 41 is supplied through the brine introducing pipe 45 into the pressure chamber 17 even in a case where the valve opening 31 of the valve 29 is opened when the piston 13 assumes the lower end position and the suction operation is performed. Consequently, since the pressure in the pressure chamber 17 is prevented from being rendered excessively negative, the pump 43 can be prevented from being overloaded and a noise can be prevented from being produced.

Figure 4:
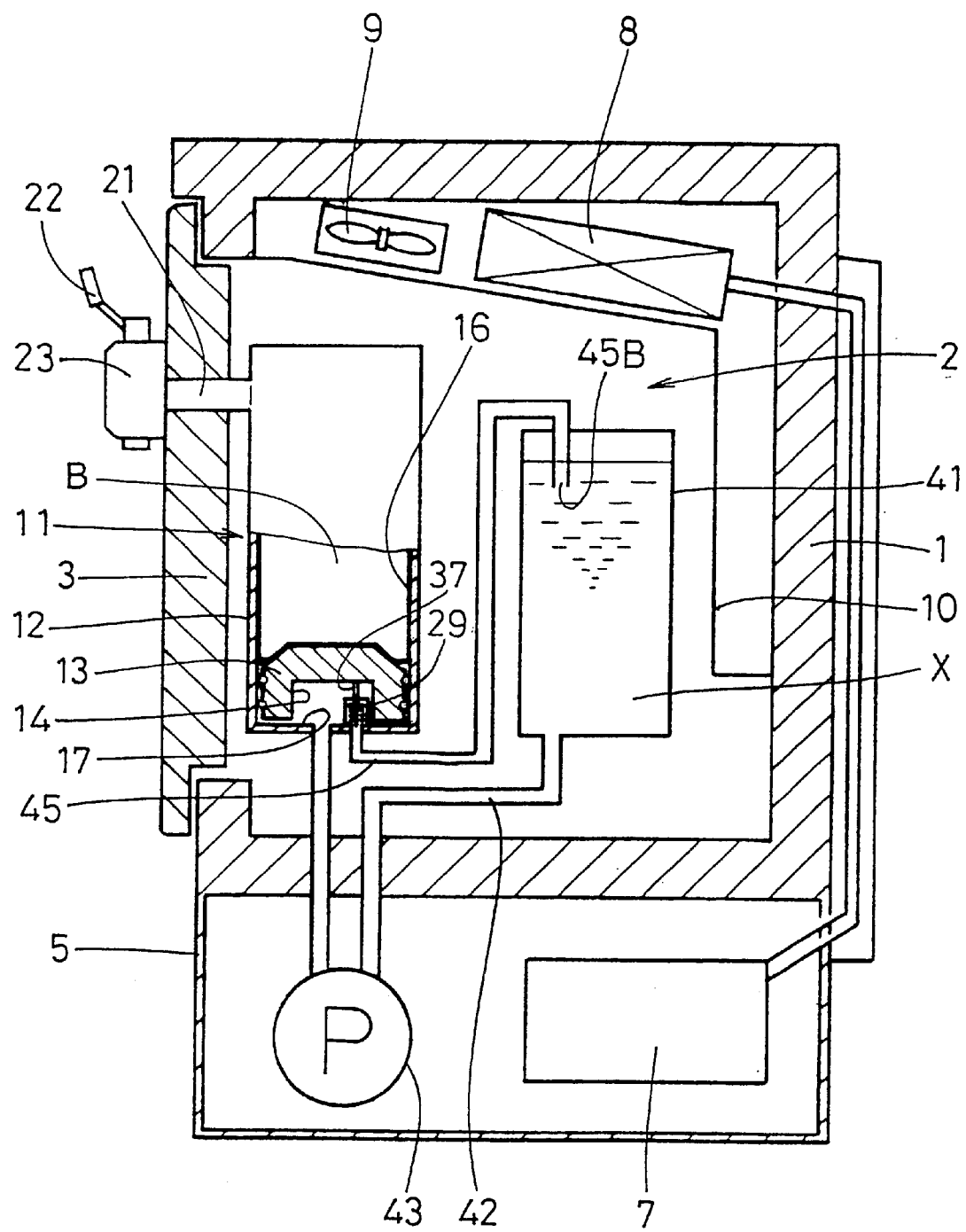
FIG. 4 is a longitudinal sectional view of the ice cream dispenser of a third embodiment in accordance with the invention.

FIG. 4 illustrates a third embodiment of the invention. The third embodiment is a modified form of the second embodiment. An inlet 45B of the brine introducing pipe 45 extends further to the ceiling side of the brine tank 41, being dipped into the brine X in the brine tank 41. The other construction of the ice cream dispenser of the third embodiment is the same as that in the second embodiment and accordingly, the same effect can be achieved from the third embodiment as from the second embodiment.

Figure 5:
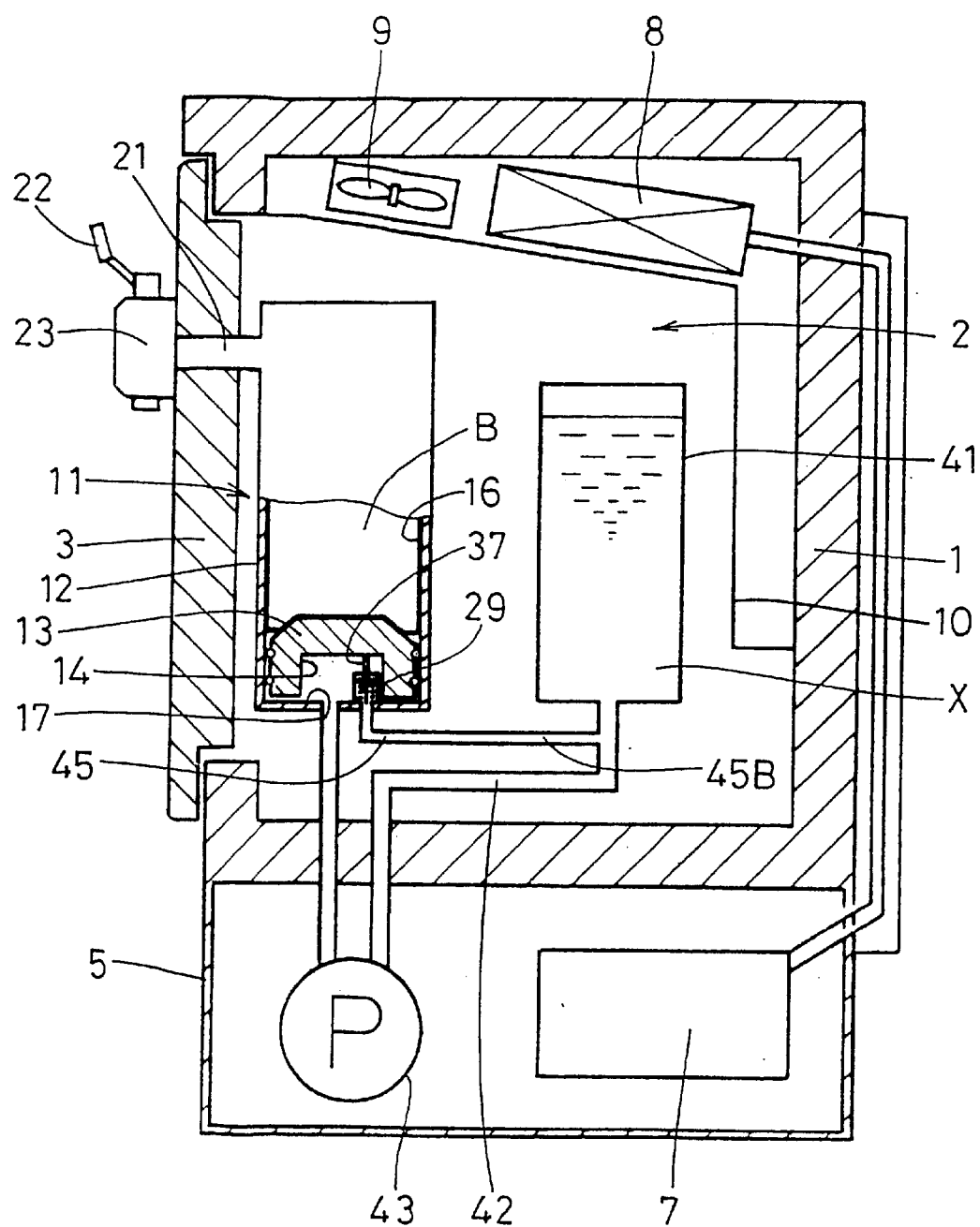
FIG. 5 is a longitudinal sectional view of the ice cream dispenser of a fourth embodiment in accordance with the invention.

FIG. 5 illustrates a fourth embodiment. The fourth embodiment is also a modified form of the second embodiment. The inlet 45B of the brine introducing pipe 45 is connected to the middle of the brine passage 42. The other construction of the ice cream dispenser of the fourth embodiment is the same as that in the second embodiment and accordingly, the same effect can be achieved from the fourth embodiment as from the second embodiment.

Figure 6:
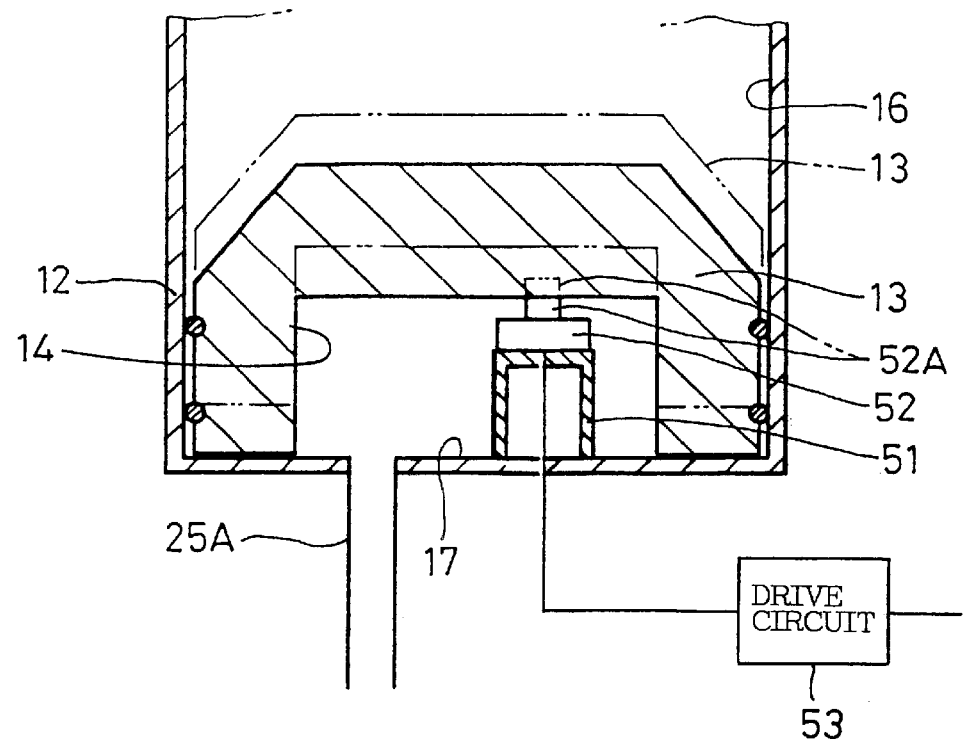
FIG. 6 is a longitudinal sectional view of the ice cream dispenser of a fifth embodiment in accordance with the invention.

FIG. 6 illustrates a fifth embodiment. The ice cream dispenser of the fifth embodiment comprises the pneumatic dispensing cylinder 11 as used in the first embodiment. In the fifth embodiment, means is provided for detecting the reach of the piston 13 to the lower end position and delivering a signal, and stopping the air drawing operation of the pump 25 from the pressure chamber 17 on the basis of the signal. For this purpose, a push button switch 52 is mounted on a mount 51 further mounted on the bottom of the cylinder 12. The push button switch 52 includes a button 52A which is depressed by the ceiling of the recess 14 to be operated when the piston 13 reaches the lower end position. The push button switch 52 is connected to a drive circuit 53 for a motor driving the pump 25.

When the piston 13 reaches the lower end position, the push button switch 52 is actuated so that a stop signal is delivered to the drive circuit 53. On the basis of the delivered signal, a pump motor and accordingly, the pump 25 are stopped. Consequently, since the interior of pressure chamber 17 is prevented from being rendered excessively negative, the pump 25 can be prevented from being overloaded and the noise can be prevented from being produced. The drive circuit 53 is set so as to re-start after having stopped the pump motor in response to the signal from the push button switch 52 irrespective of the state of the push button switch 52.

Figure 7:
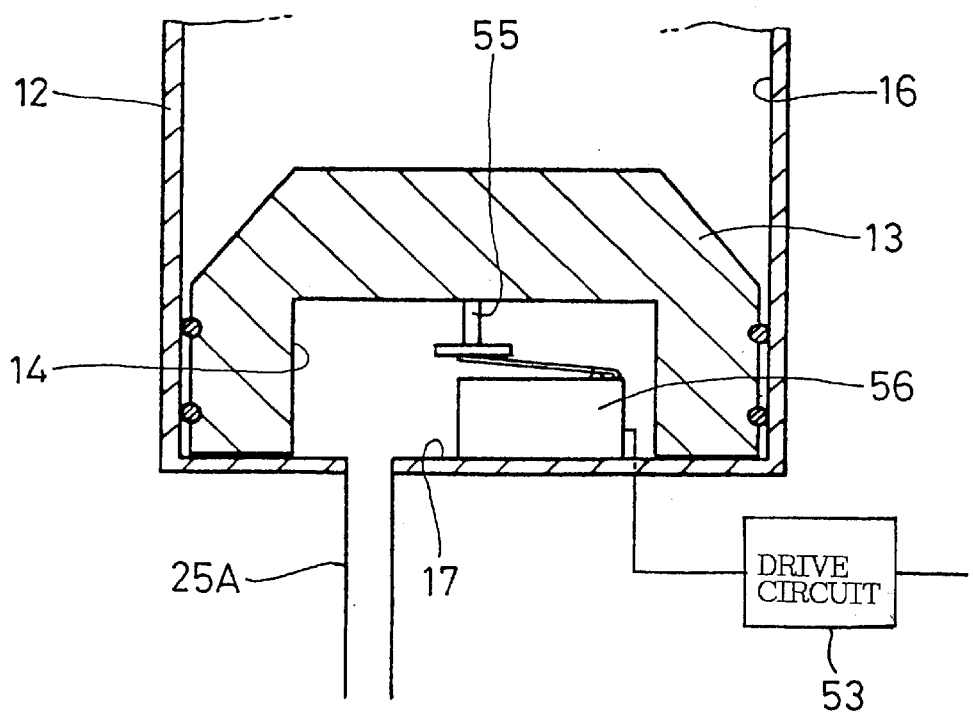
FIG. 7 is a longitudinal sectional view of the ice cream dispenser of a sixth embodiment in accordance with the invention.

FIG. 7 illustrates a sixth embodiment. In the sixth embodiment, a microswitch 56 is provided for detecting the reach of the piston 13 to the lower end position. The microswitch 56 is actuated by an operating member 55 protruding from the ceiling of the recess 14 of the piston 13. The other construction of the ice cream dispenser of the sixth embodiment is the same as that in the fifth embodiment and accordingly, the same effect can be achieved from the sixth embodiment as from the fifth embodiment.

Figure 8:
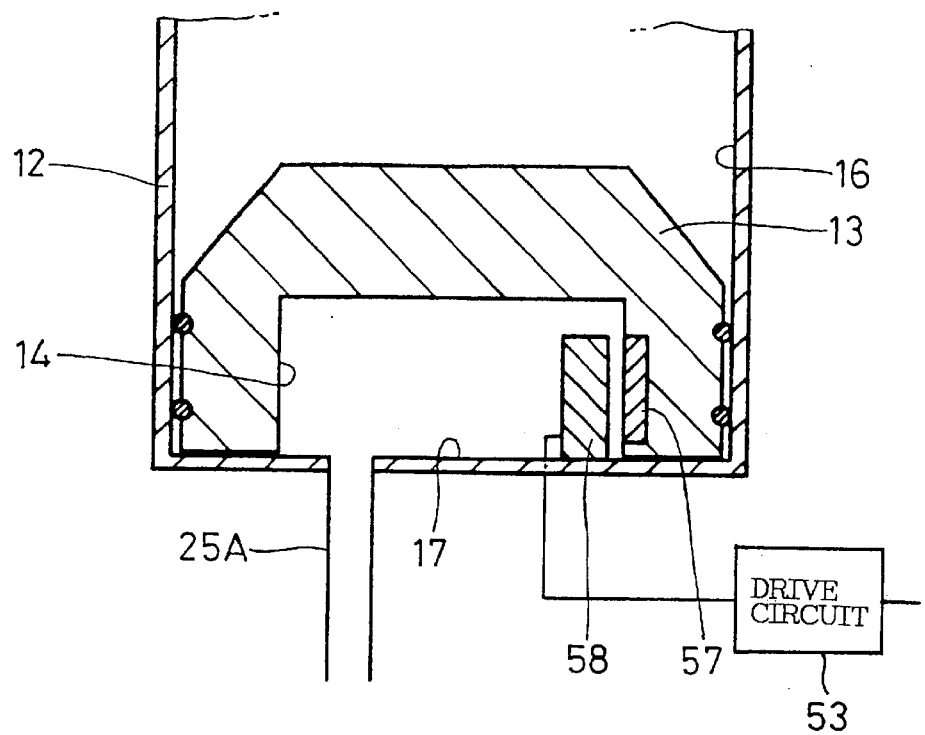
FIG. 8 is a longitudinal sectional view of the ice cream dispenser of a seventh embodiment in accordance with the invention.

FIG. 8 illustrates a seventh embodiment. In the seventh embodiment, a proximity switch 58 is provided for detecting the each of the piston 13 to the lower end position. The proximity switch 58 is actuated by a magnet 57 embedded in a side wall of the recess 14 of the piston 13. The other construction of the ice cream dispenser of the seventh embodiment is the same as that in the fifth embodiment and accordingly, the same effect can be achieved from the seventh embodiment as from the fifth embodiment.

Figure 9:
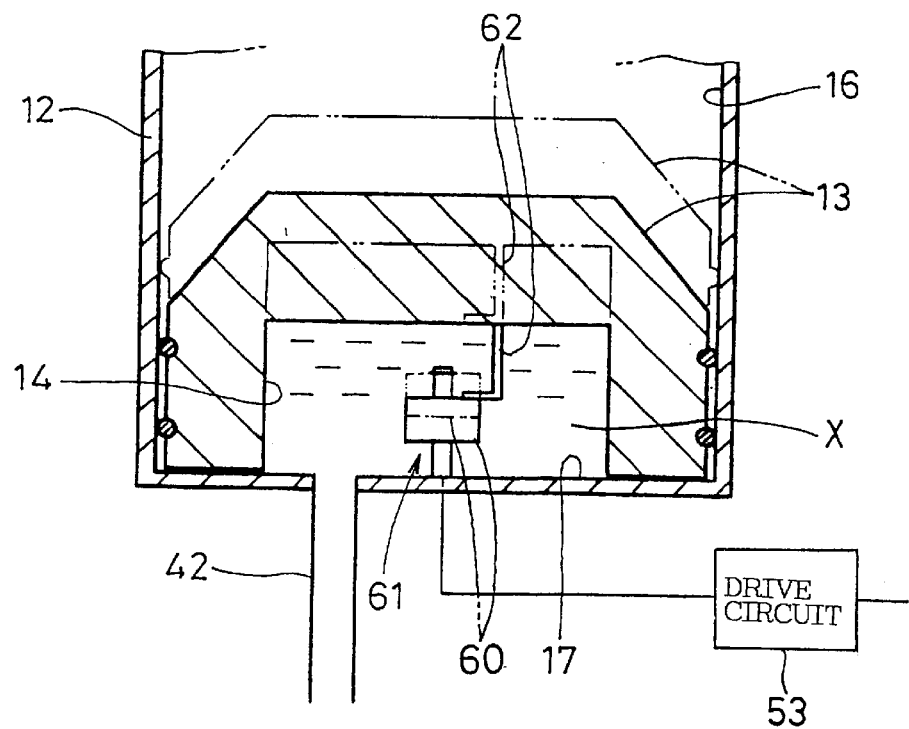
FIG. 9 is a longitudinal sectional view of the ice cream dispenser of an eighth embodiment in accordance with the invention.

FIG. 9 illustrates an eighth embodiment. The eighth embodiment is suitable for a case where a liquid such as the brine X is used as the operating fluid for the dispensing cylinder 11 as in the second embodiment. A float switch 61 is provided on the bottom of the pressure chamber 17. The float switch 61 includes a float 60 which floats and sinks such that the float switch 61 is turned on and off. A lever 62 protrudes from the ceiling of the recess 14 of the piston 13. The lever 62 depresses the float 60 downward when the piston 13 assumes the lower end position. The float switch 61 is connected to the drive circuit 53 for a motor 63 of the pump 43.

When the piston 13 assumes the lower end position, the float switch 61 is actuated to stop the pump motor 63, so that the suction operation of the pump 43 is immediately stopped. Consequently, since the pressure in the pressure chamber 17 is prevented from being rendered excessively negative, the pump 43 can be prevented from being overloaded and a noise can be prevented from being produced.

Figure 10:
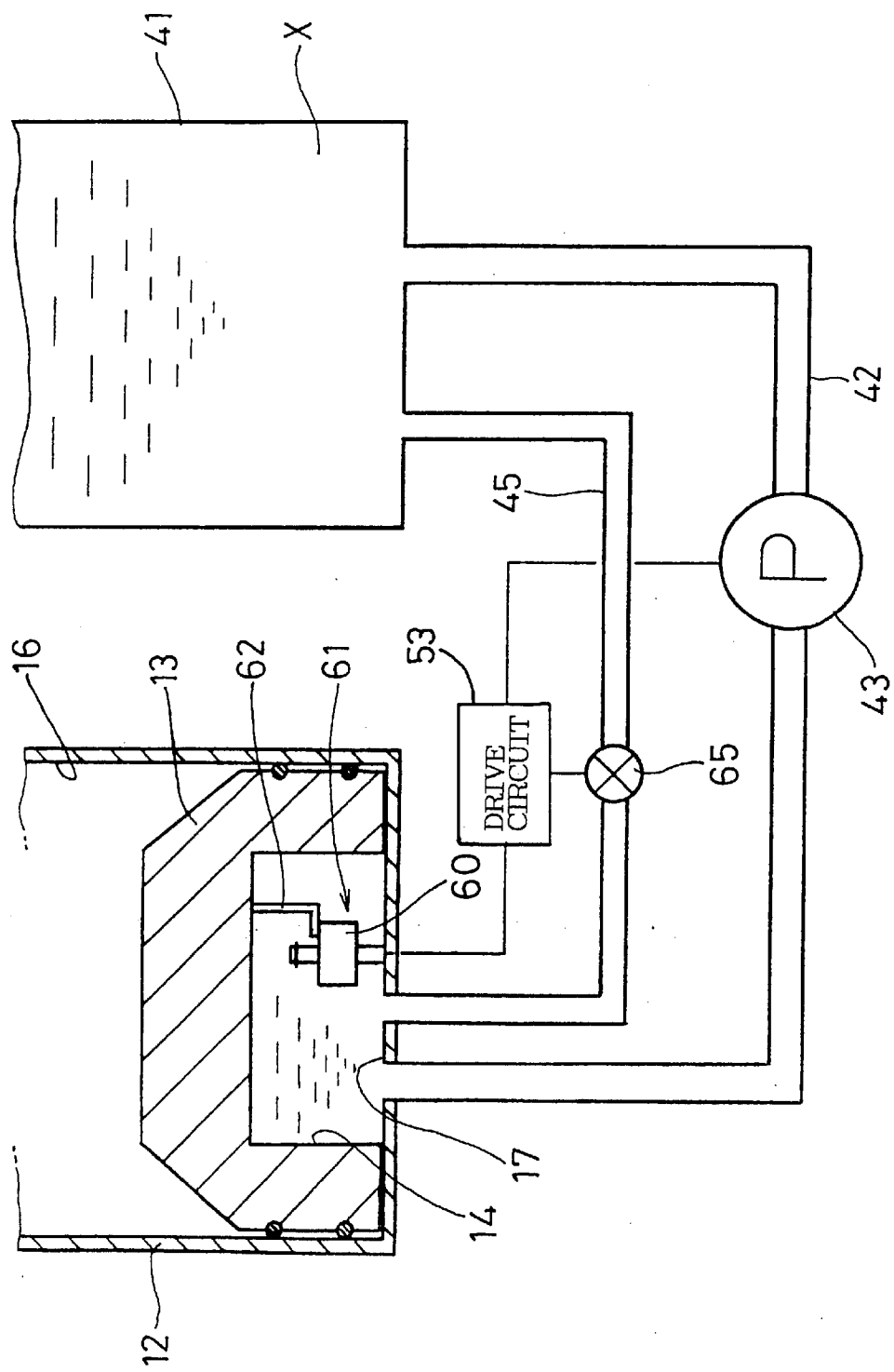
FIG. 10 is a longitudinal sectional view of the ice cream dispenser of a ninth embodiment in accordance with the invention.

FIG. 10 illustrates a ninth embodiment. In the ninth embodiment, the float switch 61 actuated by the lever 62 is provided in the same manner as in the eighth embodiment. The float switch 61 is connected to the drive circuit 53 for the motor of the pump 43. Additionally, the brine introducing pipe 45 extends from the bottom of the pressure chamber 17 to be connected to the bottom of the brine tank 41 reserving the brine X. A normally closed electromagnetic valve 65 is provided in the brine introducing pipe 45 and connected to the drive circuit 53.

When the piston 13 assumes the lower end position, the float switch 61 is actuated so that the electromagnetic valve 65 is opened as well as the pump 43 is stopped, so that the brine x in the brine tank 41 can be supplied into the pressure chamber 17. The electromagnetic valve 65 is closed upon expiration of a predetermined time timed by a timer incorporated in the drive circuit 53. Consequently, the pressure in the pressure chamber 17 can reliably be prevented from being rendered excessively negative.

Figure 11:
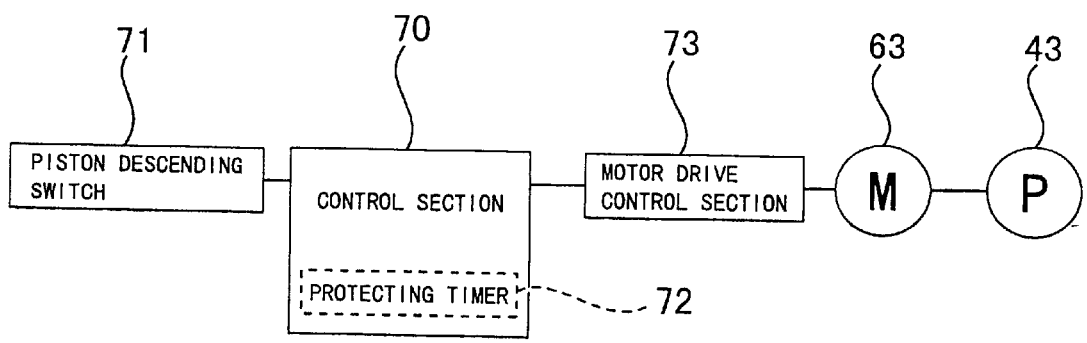
FIG. 11 is a schematic block diagram showing an electrical arrangement of the ice cream dispenser of a tenth embodiment in accordance with the invention.
Figure 12:
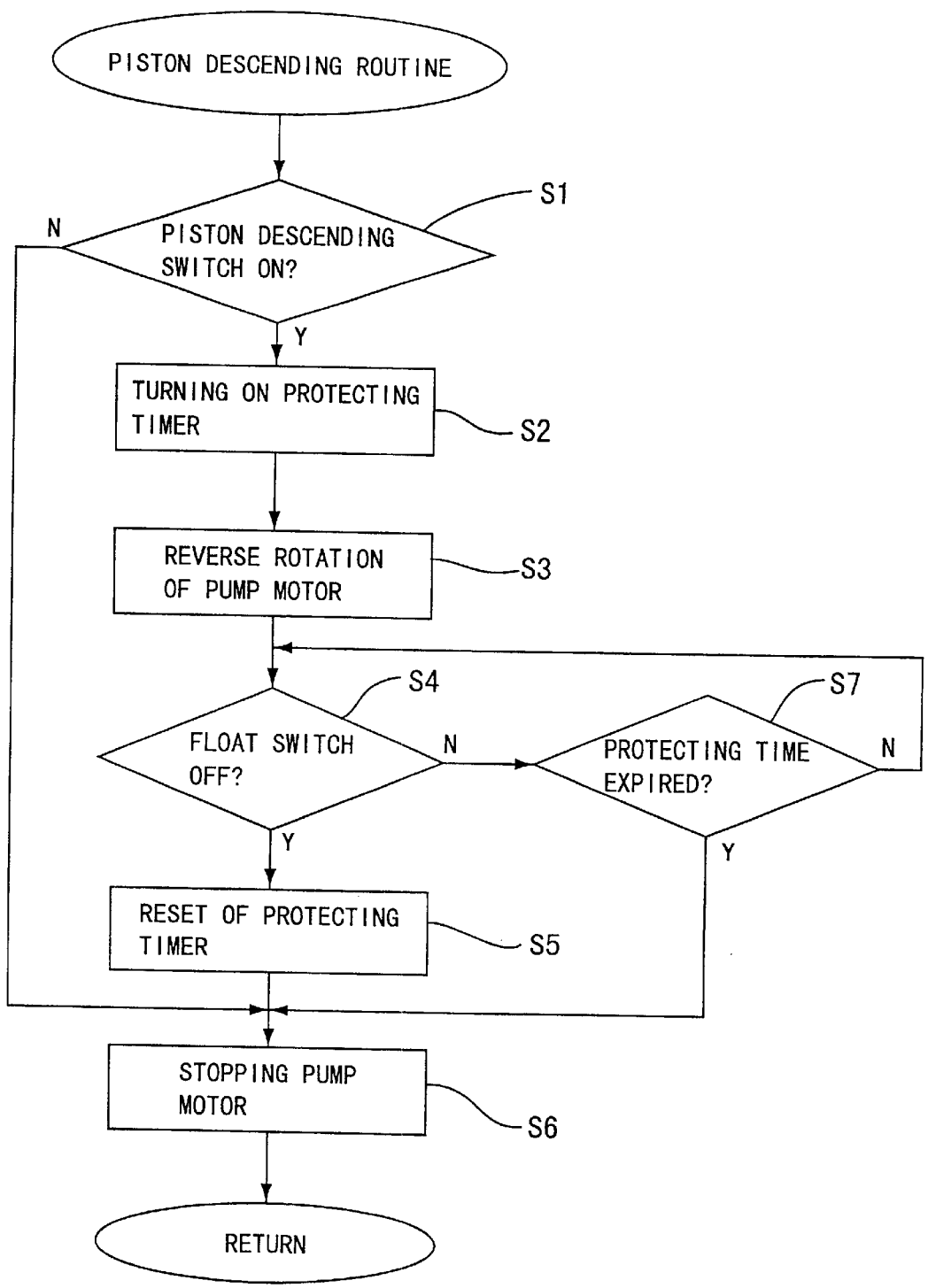
FIG. 12 is a flowchart showing a control manner of a control section in the tenth embodiment.
Figure 13:
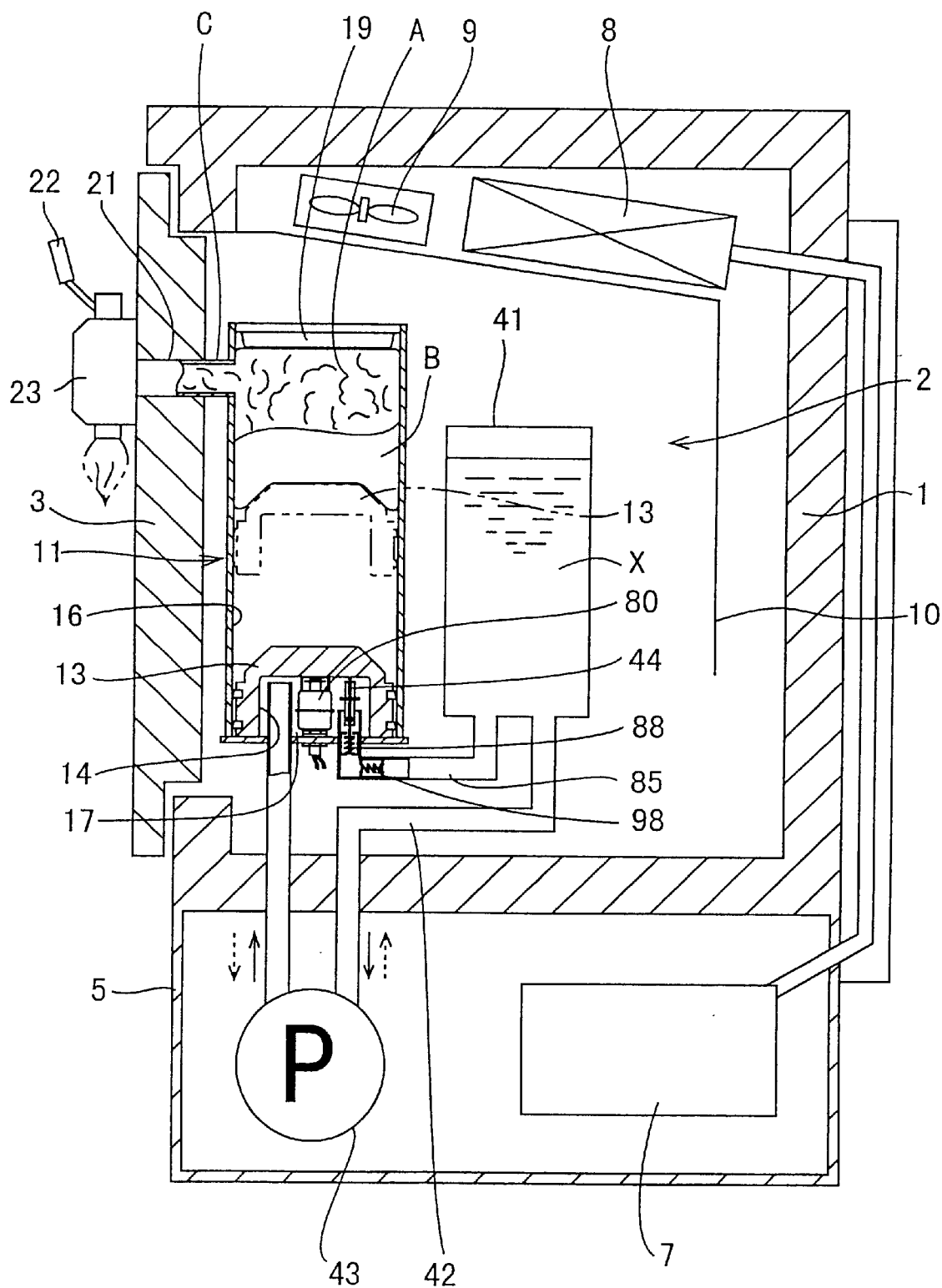
FIG. 13 is a longitudinal sectional view of the ice cream dispenser of an eleventh embodiment in accordance with the invention.

FIGS. 11 and 12 illustrate a tenth embodiment. For example, in the above ninth embodiment, when the piston 13 is descended so that the capacity of the pack accommodating chamber 16 is increased, the float switch 61 would malfunction such that the reach of the piston 13 to the lower end position cannot be detected although the piston 13 has actually reached the lower end position. Even in this case, a function is provided of stopping the pump 43 upon expiration of a predetermined time. For this purpose, a control section 70 incorporated with a microcomputer is provided as shown in FIG. 11. A piston descending switch 71 is connected to an input side of the control section 70. A protecting timer 72 is provided in the control section 70. A predetermined protecting time is set in the protecting timer 72. The protecting time is determined to be slightly longer than a time normally required for the piston 13 to be descended from the upper end position to the lower end position for the replacement of the pack B. The protecting timer 72 starts upon an ON operation of the piston descending switch 71. The pump motor 63 is connected via a motor drive circuit 73 to an output side of the control section 70.

The operation of the ice cream dispenser will now be described. The control section 70 carries out a piston descending routine as shown by the flowchart of FIG. 12. When the piston descending switch 71 is turned on in the displacement of the pack B, the control section 70 determines in the affirmative (YES) at step S1 in FIG. 12. The control section 70 then advances to step S2 to start the protecting timer 72 and further to step S3 to rotate the pump motor 63 in the reverse direction so-that the pump 43 is driven in the reverse direction. As a result, the brine X in the pressure chamber 17 is sucked in such that the pressure in the pressure chamber is rendered negative, whereupon the piston 13 is descended. This gradually increases the capacity of the pack accommodating chamber 16. When the piston 13 assumes the lower end position, the lever 62 depresses the float switch 61 to thereby turn it off, so that the control section 70 determines in the affirmative at step S4. The control section 70 advances to step S5 to reset the protecting timer 72 and then to step S6 to stop the pump motor 63 and accordingly the pump 43.

On the other hand, when the float switch 61 malfunctions, for example, the piston 13 assumes the lower end position but this is not detected. As a result, the sucking operation by the pump 43 is continued. In the embodiment, however, the piston descending switch 71 is turned on even if the reach of the piston 13 to the bottom dead point is not detected by the float switch 61. More specifically, when the protecting time set in the protecting timer 72 expires from the time the piston starts descending, the control section 70 determines in the affirmative at step S7. The control section 70 then advances to step S6 to stop the pump motor 63 and accordingly the pump 43. In other words, when a time expires which is slightly longer than the time usually required for the piston 13 to descend to the lower end position, the sucking operation by the pump 43 is stopped such that the pressure in the pressure chamber 17 can be prevented from being rendered excessively negative.

Figure 14:
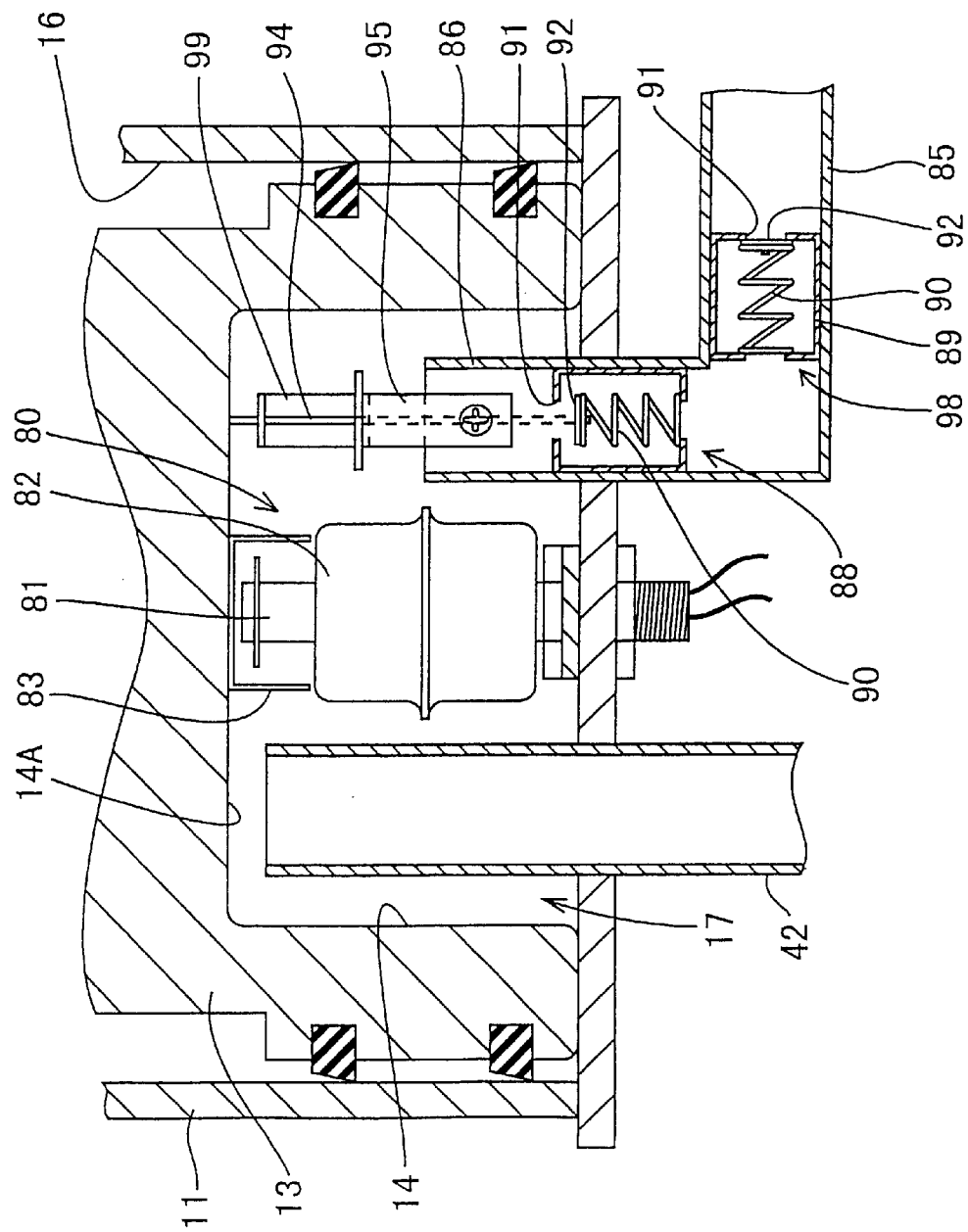
FIG. 14 is an enlarged sectional view of the structure of the bottom of the pressure chamber.
Figure 15:
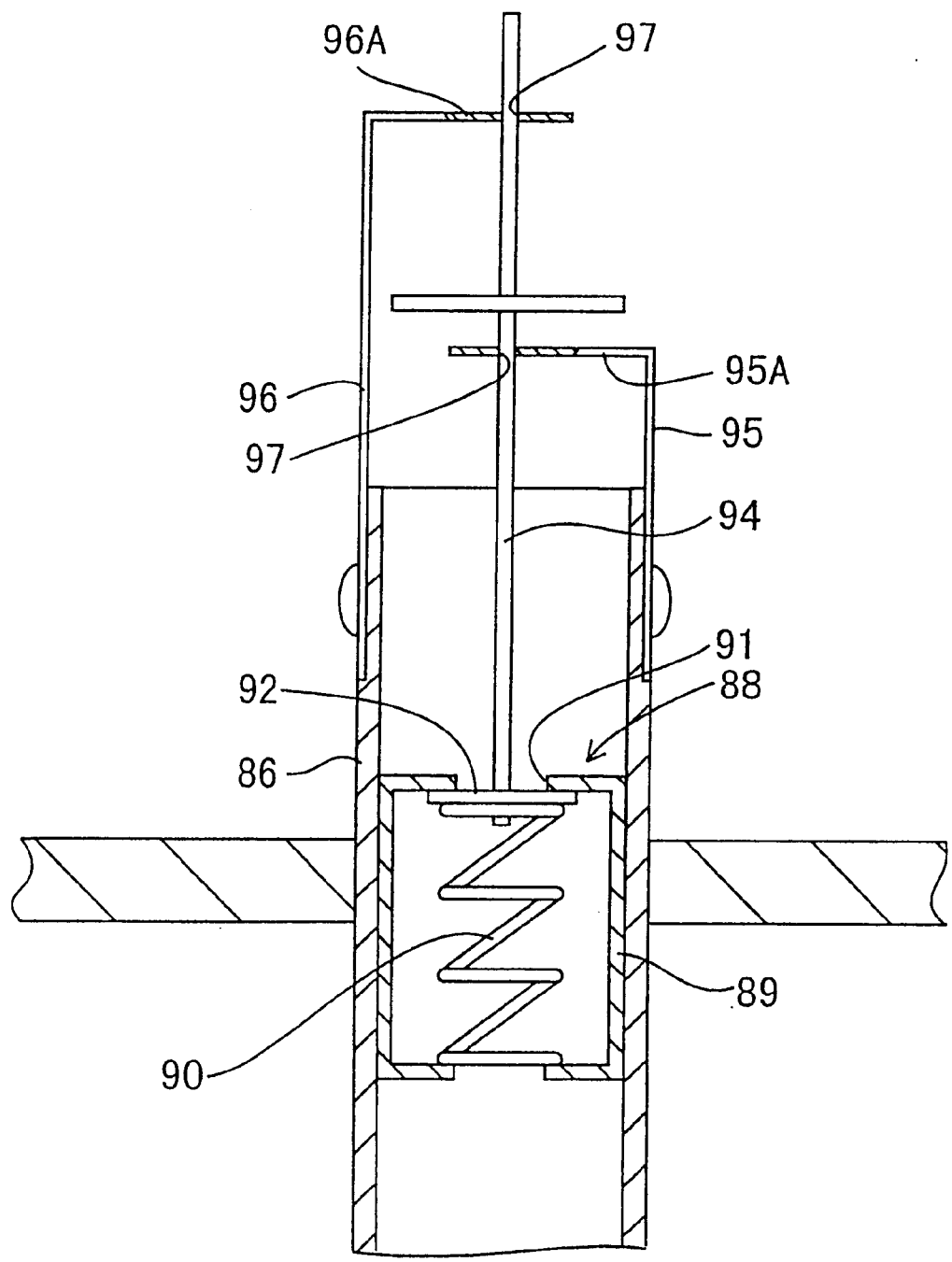
FIG. 15 is an enlarged sectional view of the structure of valve.
Figure 16:
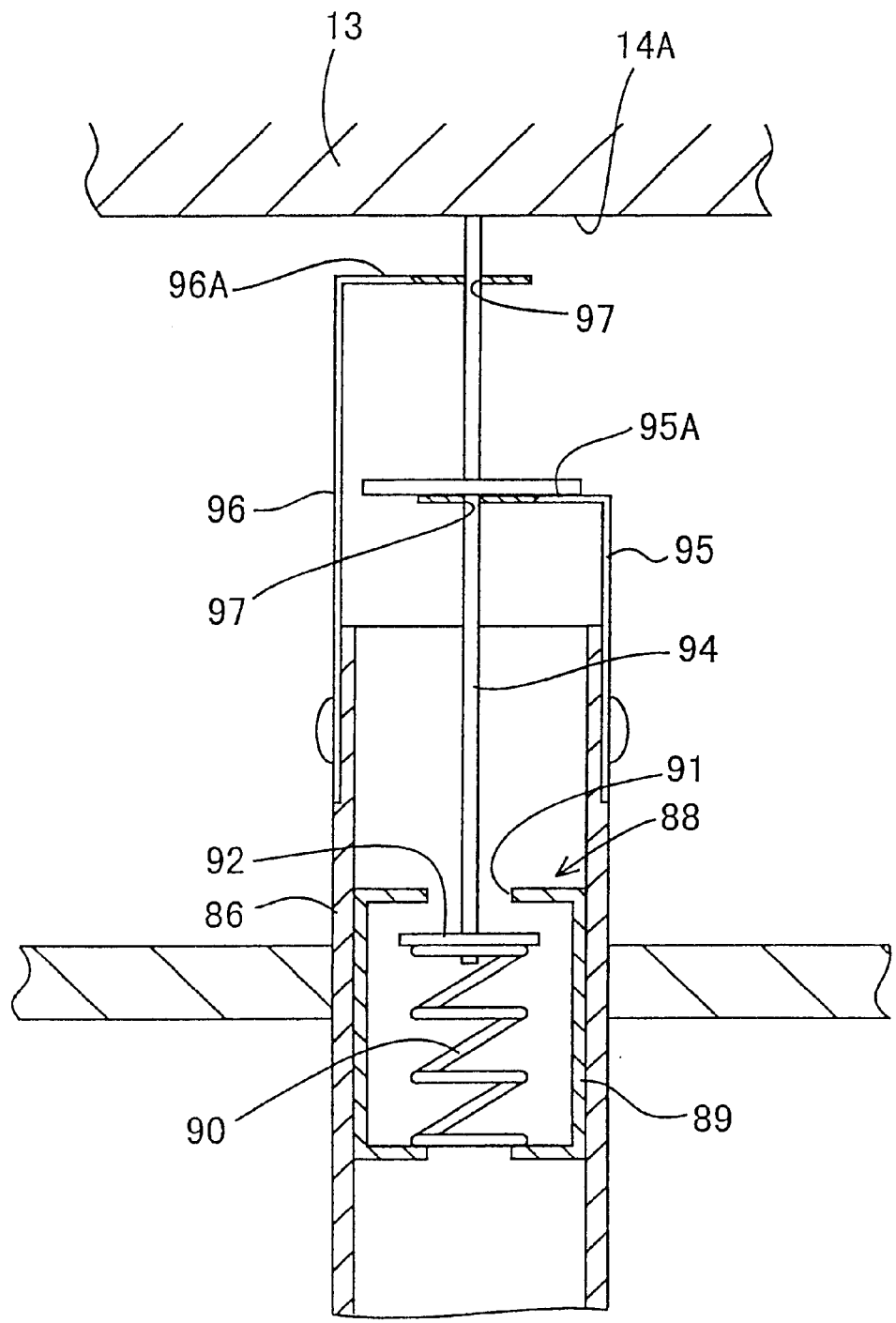
FIG. 16 is an enlarged view of the valve, showing an open state thereof.
Figure 17:
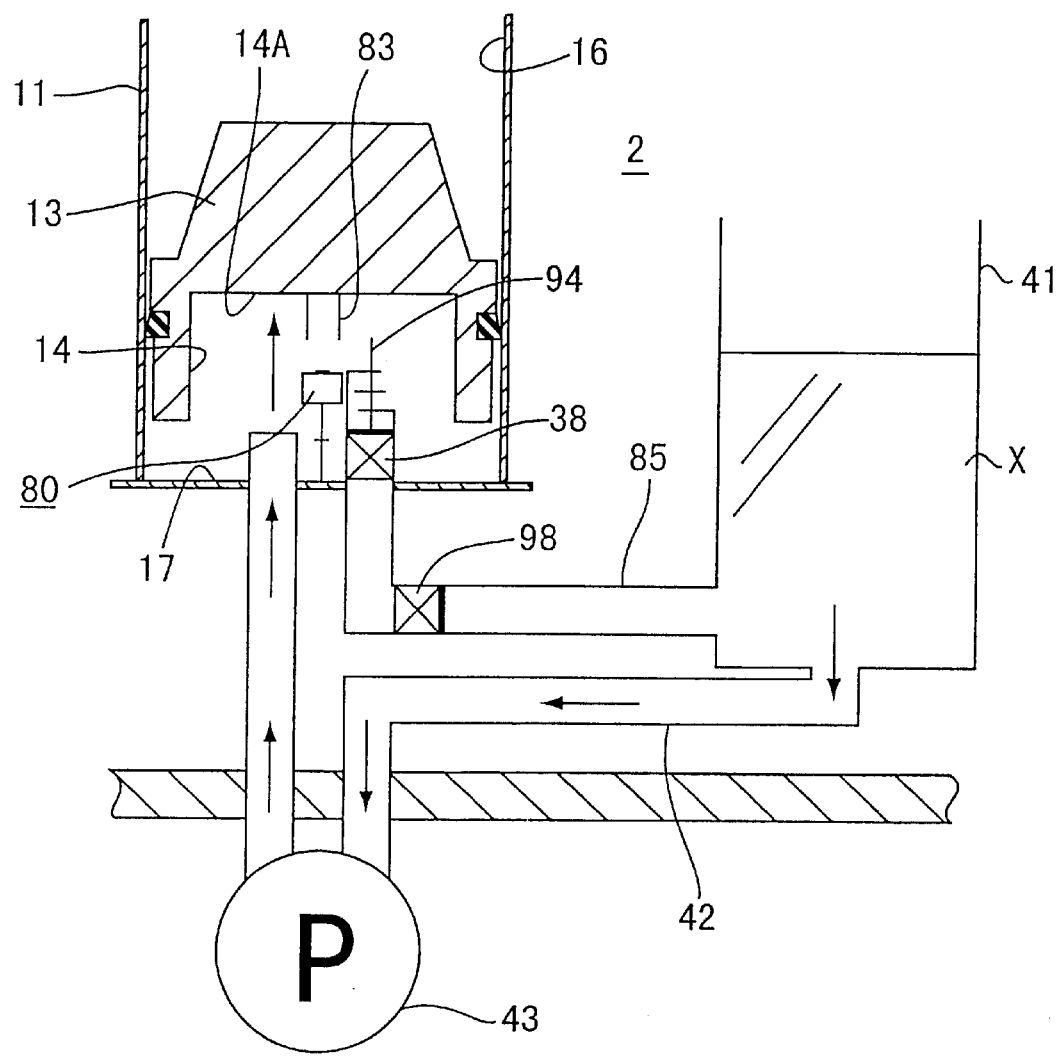
FIG. 17 schematically shows the flow of brine in the case of a normal rotation of the pump.

FIGS. 13 to 18 illustrate an eleventh embodiment. A float switch 80 is provided on the bottom of the pressure chamber 17. More specifically, the float switch 80 comprises a vertically extending guide bar 81 and a float 82 fitted with the guide bar 81 for vertical movement as shown in detail in FIG. 14. The float 82 is subjected to a buoyancy of the brine X supplied into the pressure chamber 17 to thereby float as shown in FIG. 16 while the piston 13 is at the upper end position. When the piston 13 is descended to the lower end position as shown in FIG. 14, a presser plate 83 provided on the ceiling 14A of the recess 14 descends the float 82 so that the float switch 80 is turned off, whereby the reach of the piston 13 to the lower end position is detected.

An auxiliary passage 85 discrete from the brine passage 42 is provided in the freezing compartment 2 so as to connect the bottom of the pressure chamber 17 and the brine tank 41 to each other. The auxiliary passage 85 includes a vertical port 86 connected to the pressure chamber 17 side. A valve 88 is provided in the port 86. The valve 88 includes a circular box-shaped valve body 89 having upper and lower ends both with central holes respectively as shown in FIG. 15. The valve body 89 is fitted in the port 86. A compression coil spring 90 is provided in the valve body 89 to be located between the upper and lower ends thereof. A valve plate 92 is mounted on an upper end of the coil spring 90 so as to close the upper central opening or valve opening 91. The valve plate 92 is usually urged by the spring force of the coil spring 90 so as to close the valve opening 91 at the inside of the upper wall of the valve body 89, thereby shutting off a flow of brine in the auxiliary passage 85 from the brine tank 41 side to the pressure chamber 17.

A rod 94 projects upwardly from the center of the valve plate 92 of the valve 88. A pair of L-shaped guide plates 95 and 96 are mounted on the upper end of the port 86 to be opposite to each other. The guide plates 95 and 96 include horizontal portions 95A and 96A having different levels respectively. The horizontal portions 95A and 96A have respective guide holes 97 through which the rod 94 is inserted for sliding motion. An upper end of the rod 94 is allowed to abut the ceiling 14A of the recess 14 of the piston 13. When the piston 13 assumes the lower end position, the ceiling 14A depresses the upper end of the rod 94 so that the rod 94 and the valve plate 92 are descended a predetermined distance with the coil spring 90 being compressed, whereupon the valve opening 91 is opened, as shown in FIG. 16.

A lower end of the port 86 of the auxiliary passage 85 is bent horizontally toward the brine tank 41 side. A check valve 98 is provided in a bent portion. The check valve 98 has the same construction as the valve 88 except that the valve plate 92 is provided with no rod 94. The valve body 89 of the check valve 98 is disposed sideways and the valve plate 92 is mounted on the right-hand end of the coil spring 90 so as to close the valve opening 91, namely, so as to shut off the flow of the brine from the pressure chamber 17 side to the brine tank 41, as viewed in FIG. 14.

The operation of the ice cream dispenser of the eleventh embodiment will be described. The dispensing operation will first be described. The pack B containing the ice cream A is accommodated in the pack accommodating chamber 16 of the dispensing cylinder 11. When the ice cream A is to be dispensed, the dispensing cock 22 is opened and the dispensing switch (not shown) is turned on. As a result, the pump 43 is driven in the normal direction so that the brine X in the brine tank 41 is supplied through the brine passage 42 into the pressure chamber 17 as shown by broken line arrows in FIG. 13 and arrows in FIG. 17. In this while, the check valve 98 prevents the brine from flowing toward the brine tank 41 side even if the pressure of the supplied brine X opens the valve opening 91 of the valve 88 against the urging force of the coil spring 90. Thus, the brine X is prevented from returning through the auxiliary passage 85 to the brine tank 41 side. Accordingly, the brine X supplied into the pressure chamber 17 ascends the piston 13 so that the pack B is compressed, whereupon the ice cream A is dispensed from the pack B. When a suitable amount of ice cream A is dispensed, the dispensing cock 22 is closed and the dispensing switch is turned off. As a result, the pump 43 is stopped so that the dispensing operation is also stopped. The above-described operation is repeated so that the ice cream A is dispensed.

Figure 18:
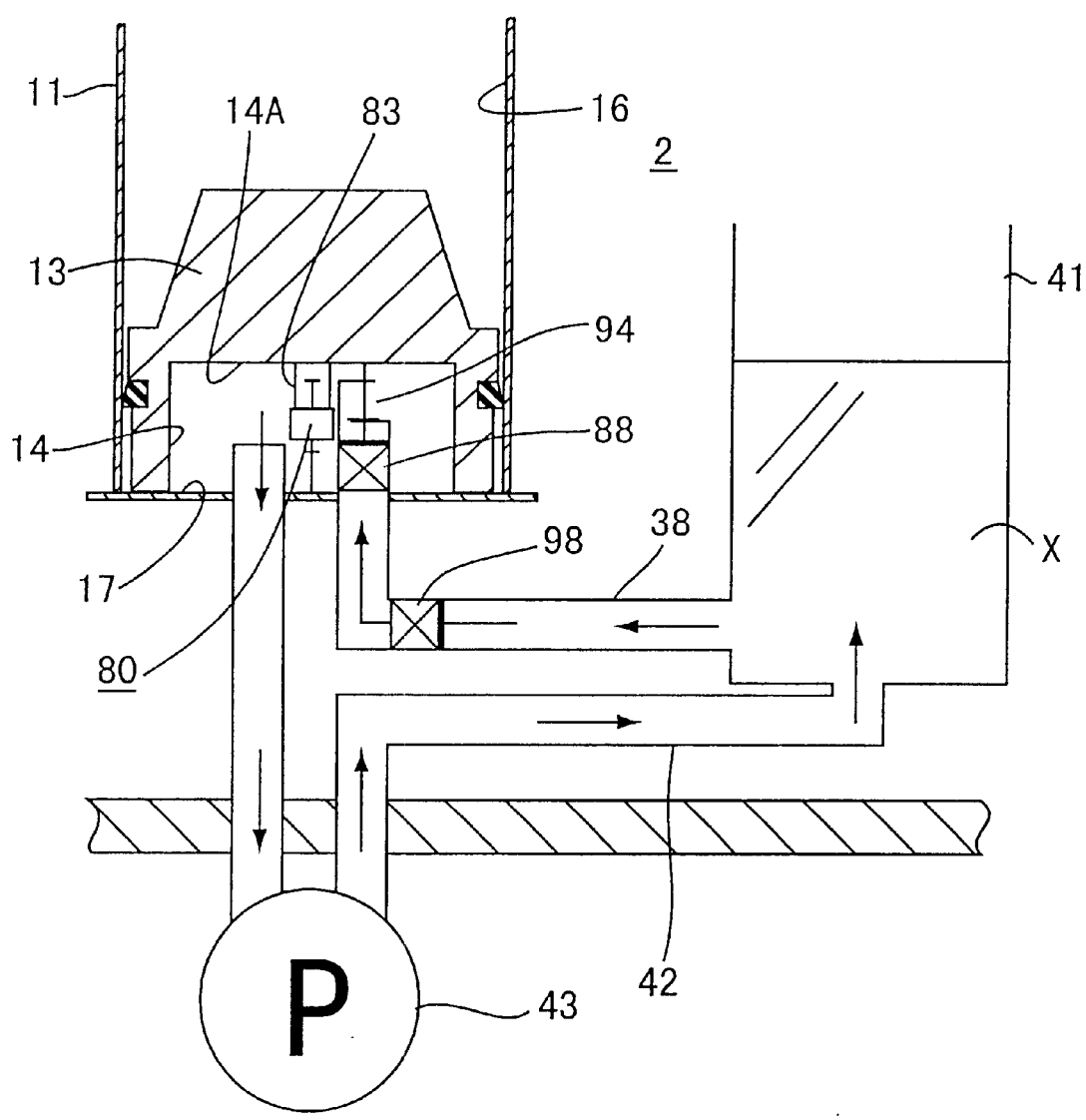
FIG. 18 schematically shows the flow of the brine when the piston has reached the bottom dead point.

When the ice cream A contained in the pack B has been used up, the pack B is replaced by a new one. Prior to the replacement, the piston 13 assuming an upper end position is descended so that the capacity of the pack accommodating chamber 16 is increased. For this purpose, a pack replacing switch (not shown) is turned on so that the pump 43 is driven in the reverse direction. As a result, the brine X in the pressure chamber 17 is sucked in to be returned into the brine tank 41 as shown by broken line arrows in FIG. 13. In this while, the valve 88 prevents the brine X from flowing to the pressure chamber 17 side, so that the brine X does not flow through the auxiliary passage 85 to the pressure chamber 17 side. The pressure in the pressure chamber 17 is rendered negative when the brine X in the pressure chamber 17 is sucked. The piston 13 is then descended such that the capacity of the pack accommodating chamber 16 is increased. When the piston is descended to thereby assume the lower end position as shown in FIGS. 14 and 18, the ceiling 14A of the recess 14 of the piston 13 depresses the upper end of the rod 94 of the valve 88, so that the valve plate 92 is moved downward against the spring force of the coil spring 90 such that the valve opening 91 is opened.

With this, the descent of the piston 13 to the lower end position is detected by the float switch 80, so that the reverse rotation of the pump 43 is stopped. The sucking operation is sometimes continued due to an inertia of the pump 43 etc. However, even if the sucking operation of the pump 43 is continued, the valve opening 91 of the valve 88 is opened as described above such that the brine X in the brine tank 41 is introduced through the auxiliary passage 85 into the pressure chamber 17 with the check valve 98 being opened. Consequently, the pressure in the pressure chamber 17 is prevented from being rendered excessively negative.

When the descending of the piston 13 is completed, the cap 19 is detached and the used pack B is taken out of the pack accommodating chamber 16. A new pack B is then accommodated into the chamber 16. The brine X is supplied into the pressure chamber 17 upon the dispensing operation. The pressure in the pressure chamber 17 immediately increases when the brine X is supplied thereinto. However, since the check valve 98 of the auxiliary passage 85 is not opened, the pressure is prevented from escaping. As a result, the piston 13 is ascended so that the rod 94 and the valve plate 92 are moved upward to thereby close the valve opening 91 of the valve 88.

According to the eleventh embodiment, the piston 13 is descended so that the capacity of the pack accommodating chamber 16 is increased. Even if the sucking operation for the pressure chamber 17 is still continued after the piston has reached the lower end position, the brine X is introduced through the auxiliary passage 85 into the pressure chamber 17. Consequently, since the pressure in the pressure chamber 17 is prevented from being rendered excessively negative, the pump 43 can be prevented from being overloaded and a noise can be prevented from being produced.

Figure 19:
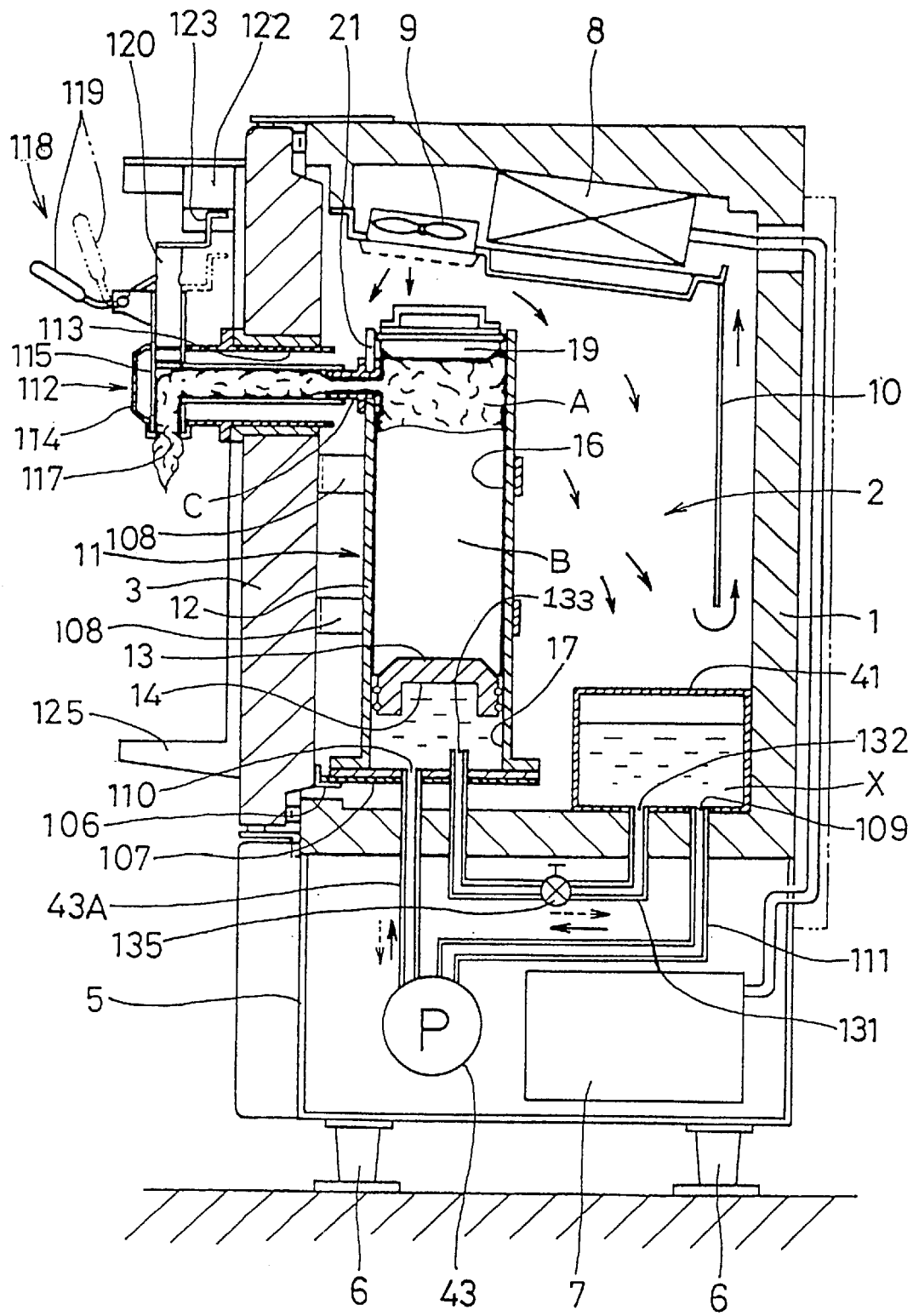
FIG. 19 is a longitudinal sectional view of the ice cream dispenser of a twelfth embodiment in accordance with the invention.
Figure 20:
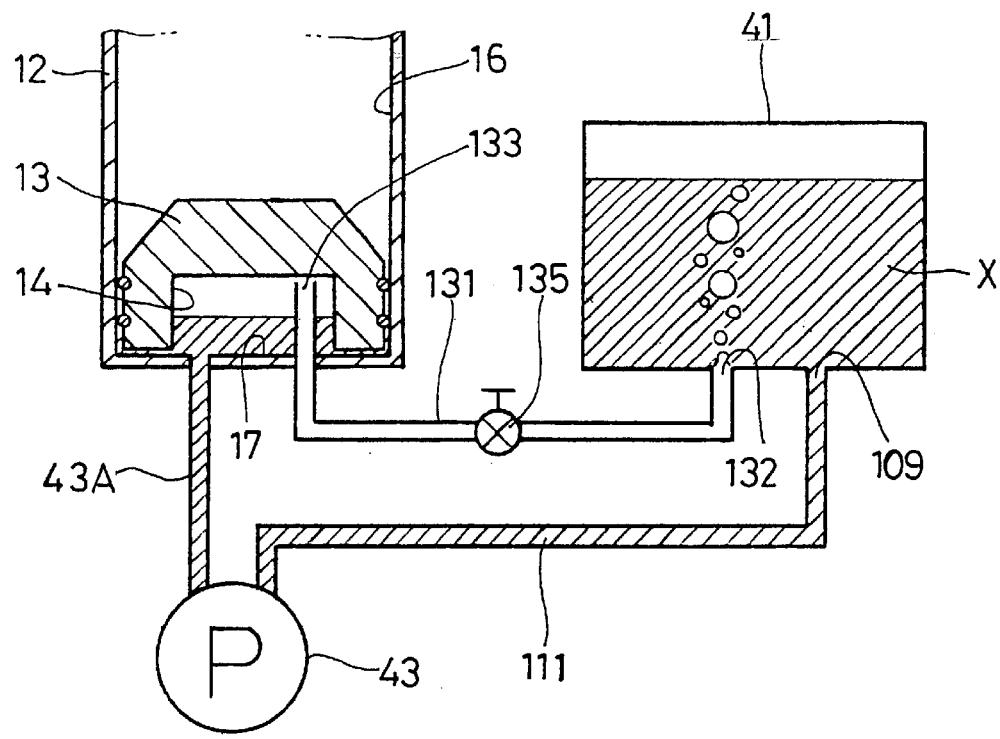
FIG. 20 shows a deflating operation.
Figure 21:
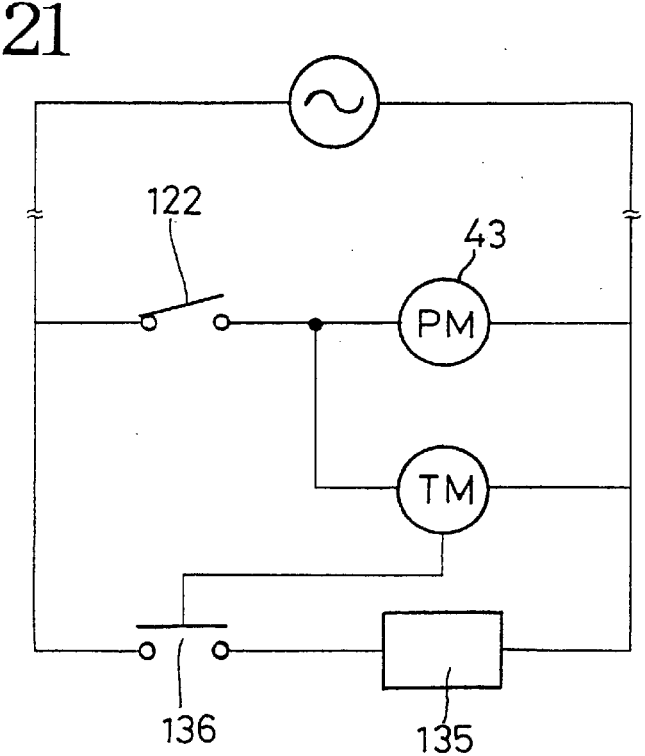
FIG. 21 is a schematic circuit diagram showing a control circuit for an electromagnetic valve.

FIGS. 19 to 21 illustrate a twelfth embodiment. In the twelfth embodiment, the dispensing cylinder 11 is mounted on a support plate 107 mounted on a hinge 106 further mounted on the inside of the heat-insulating door 3. Further, the dispensing cylinder 11 is held by two belts 108 provided on the inside of the heat-insulating door 3. The brine tank 41 is provided on the rear bottom of the freezing compartment 2 for reserving the brine X. Two ports 109 and 110 are open in the bottoms of the brine tank 41 and the pressure chamber 17 respectively. A brine passage 111 provided in the machine compartment 5 connects both ports 109 and 110 to each other. The reversible pump 43 driven in the normal and reverse directions is provided in the middle of the brine passage 111. When the pump 43 is driven in the normal direction, the brine X in the brine tank 41 is supplied into the pressure chamber 17 of the dispensing cylinder 11. On the other hand, when the pump 43 is driven in the reverse direction, the brine X in the pressure chamber 17 is returned into the brine tank 41.

The heat-insulating door 3 is provided with a dispensing section 112 for the ice cream A. More specifically, the heat-insulating door 3 has a mounting through hole 113. A cylindrical member 114 having a closed front end extends through the mounting hole 113 so as to protrude forward. A T-shaped pipe 115 is provided in the cylindrical member 114 with a predetermined clearance therebetween. A horizontal pipe of the T-shaped pipe 115 has a rear end formed with a connecting port connected to the supply opening C of the pack B. A vertical pipe of the T-shaped pipe 115 has upper and lower ends extending through the cylindrical member 114 upward and downward respectively. The lower end of the vertical pipe serves as a dispensing opening 117. A dispensing cock 118 is provided at the upper end side of the vertical pipe. The dispensing cock 118 includes a lever 119 rotated so that a valve element 120 is moved upward or downward. The dispensing opening 117 is opened when the lever 119 is rotated from a position shown by chain line in FIG. 19 to a position shown by solid line.

A normally open microswitch 122 is provided on the outer face of the door 3 so as to be located over the dispensing section 112. The microswitch 122 controls start and stop of an electric motor (not shown) of the brine-supplying reversible pump 43 in the normal direction. The valve element 120 of the dispensing cock 118 is provided with an operation plate 123. When the valve element 120 is moved upward so that the dispensing opening 117 is opened, the operation plate 123 presses an actuator so that the microswitch 122 is turned on. A support plate 125 is mounted on the outer face of the door 3 so as to be located below the dispensing section 112. A vessel for receiving the dispensed ice cream A is placed on the support plate 125.

An air removing pipe 131 connects the pressure chamber 17 of the dispensing cylinder 11 and the brine tank 41 to each other. The air removing pipe 131 extends through the interior of the machine compartment 5 and has at one end side an outlet 132 connected to the bottom of the brine tank 41 and at the other end side an inlet 133 extending through the bottom of the pressure chamber 17 and protruding upward, as shown in detail in FIG. 20. The inlet 133 protrudes to such a level as to be adjacent to the ceiling of the recess 14 of the piston 13 with a slight gap therebetween when the piston 13 assumes the bottom dead point where the piston collides with the bottom of the cylinder 12.

A normally closed electromagnetic valve 135 is provided across the air removing pipe 131 and incorporated into a control circuit as shown in FIG. 21. More specifically, when the microswitch 122 is turned on in an initial dispensing operation, the pump motor is energized to drive the pump 43 in the normal direction. With this, the electromagnetic valve 135 is energized via a timer TM and a timer switch 136 to thereby be opened. The timer switch 136 is opened when the timer TM times a predetermined time, whereupon the electromagnetic valve 135 is deenergized and thereafter, maintained in the closed state.

The operation of the ice cream dispenser of the twelfth embodiment will now be described. The normal dispensing operation will first be described. When the ice cream A is to be dispensed, the vessel (not shown) is placed on the support plate 125. The lever 119 of the dispensing cock 118 is rotated to the solid line position in FIG. 19 so that the dispensing opening 117 is opened. Since the microswitch 122 is simultaneously turned on, the reversible pump 43 is driven in the normal direction. Then, the brine X in the brine tank 41 is pumped up to be supplied into the pressure chamber 17 of the dispensing cylinder 11 as shown by solid line arrows in FIG. 19 and pressurized. As a result, since the piston 13 is ascended so that the pack B is compressed, the ice cream A is caused to flow through the supply opening C out of the pack B. The ice cream A is dispensed through the dispensing opening 117 into the vessel. The lever 119 of the dispensing cock 118 is rotated to the chain line position in FIG. 19 when a suitable amount of ice cream A is dispensed out. The microswitch 122 is then turned off such that the reversible pump 43 is stopped. Further, the dispensing opening 117 is closed so that the dispensing is stopped. The above-described dispensing operation is repeated so that the ice cream A is repeatedly dispensed.

When the ice cream A contained in the pack B has been used up, the pack B is replaced by a new one. A pack replacing switch (not shown) is turned on so that the pump 43 is driven in the reverse direction. As a result, the brine X in the pressure chamber 17 is sucked in to be returned into the brine tank 41 as shown by broken line arrows in FIG. 19. Since the pressure in the pressure chamber 17 is rendered negative, the piston 13 is descended such that the capacity of the pack accommodating chamber 16 is increased. The pump 43 is stopped when the piston 13 is descended to abut the bottom of the cylinder 12. The heat-insulating door 3 is opened and the cap 22 is detached. The used pack B is taken out of the cylinder 12 and a new one is accommodated therein so that the ice cream A can be re-dispensed.

When the frozen dessert dispenser is operated for the first time after installation, air sometimes remains in the pipe 43A at the discharge side of the pump 43 and/or in the recess 14 of the piston 13. Further, in a case where a sealing member used in the piston 13 is deteriorated, air sometimes leaks from the interior of the cylinder 12 over the top of the piston 13 to the interior of the cylinder 12 below the underside of the piston 13 even during an ordinary operation when the brine X is sucked so that the piston 13 is descended. As a result, the leaked air sometimes remains in the interior of the cylinder 12 below the underside of the piston 13.

However, in a case where the dispensing cock 118 is opened so that the microswitch 122 is turned on when the dispensing operation is initially carried out or re-started, the pump 43 is driven in the normal direction to supply the brine X from the brine tank 41 to the pressure chamber 17 side. With this, the electromagnetic valve 135 of the air removing pipe 131 is opened. The air remaining in the pressure chamber 17 is caused to return into the cylinder 12 below the underside of the piston 13 upon supply of the brine X into the pressure chamber 13. As a result, the air enters the inlet 133 from the ceiling of the recess 14 to be discharged through the air removing pipe 131 into the brine tank 41 as shown in FIG. 20. When the air is sucked from the pressure chamber 17 and the air removing pipe 131, the electromagnetic valve 135 is closed and thereafter, the valve is maintained in the closed state. Consequently, the pressure chamber 17 is filled only with the brine X. Thereafter, when the brine X is supplied into the pressure chamber 17, the piston 13 is subjected to the normal pressure of the brine X such that the piston 13 is stably ascended.

According to the twelfth embodiment, the air remaining in the pressure chamber 17 is sucked through the air removing pipe 131 to the brine tank 41 side upon an initial supply of the brine X and accordingly, the pressure chamber 17 is filled with the brine X. Accordingly, since the piston 13 is subjected to pressure when the brine X is supplied to the pressure chamber 17 thereafter, the piston 13 can reliably be ascended and a stable dispensing operation can be carried out. Further, the piston 13 can smoothly be descended since substantially no air as a compressive fluid remains in the pressure chamber 17.

Figure 22:
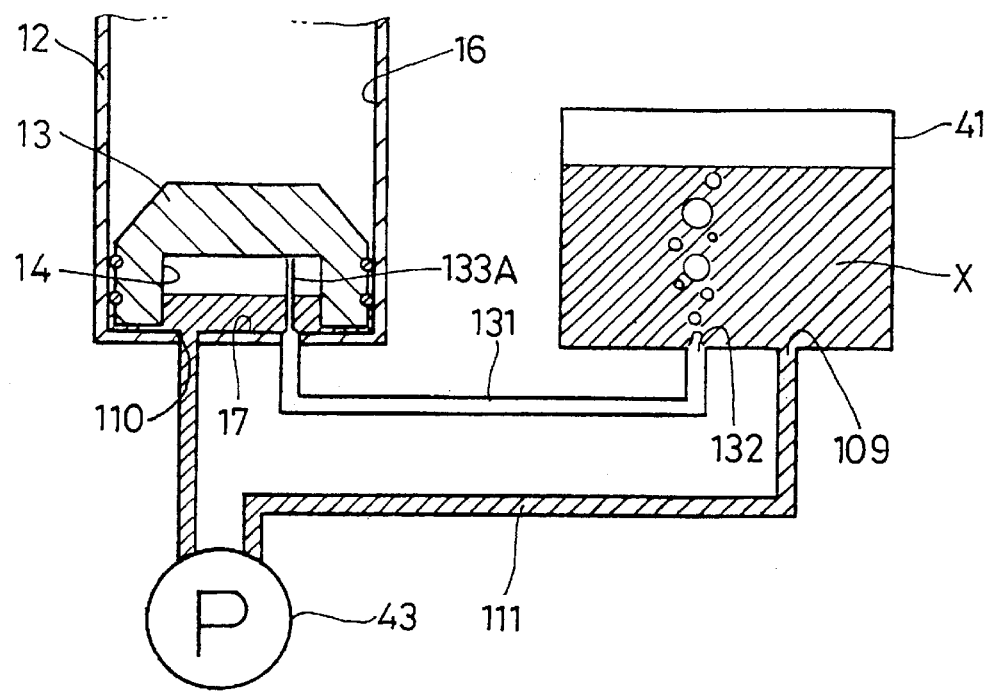
FIG. 22 shows the deflating operation in the ice cream dispenser of a thirteenth embodiment in accordance with the invention.

FIG. 22 illustrates a thirteenth embodiment. The air removing pipe 131 has an inlet 133A with a reduced diameter, and the electromagnetic valve is eliminated. In the thirteenth embodiment, when the brine X is initially supplied to the pressure chamber 17 side, the remaining air is returned to the side below the piston 13 to be discharged through the inlet 133A and the air removing pipe 131 into the brine tank 41. After the air has been sucked, the inlet 133A with the reduced diameter serves as a throttle valve, which prevents the brine X from returning to the brine tank 41 side. Since the piston 13 is normally subjected to pressure when the brine X is supplied to the pressure chamber 17 thereafter, the piston 13 can reliably be ascended and a stable dispensing operation can be carried out. Accordingly, the same effect can be achieved from the thirteenth embodiment as from the first embodiment.

Figure 23:
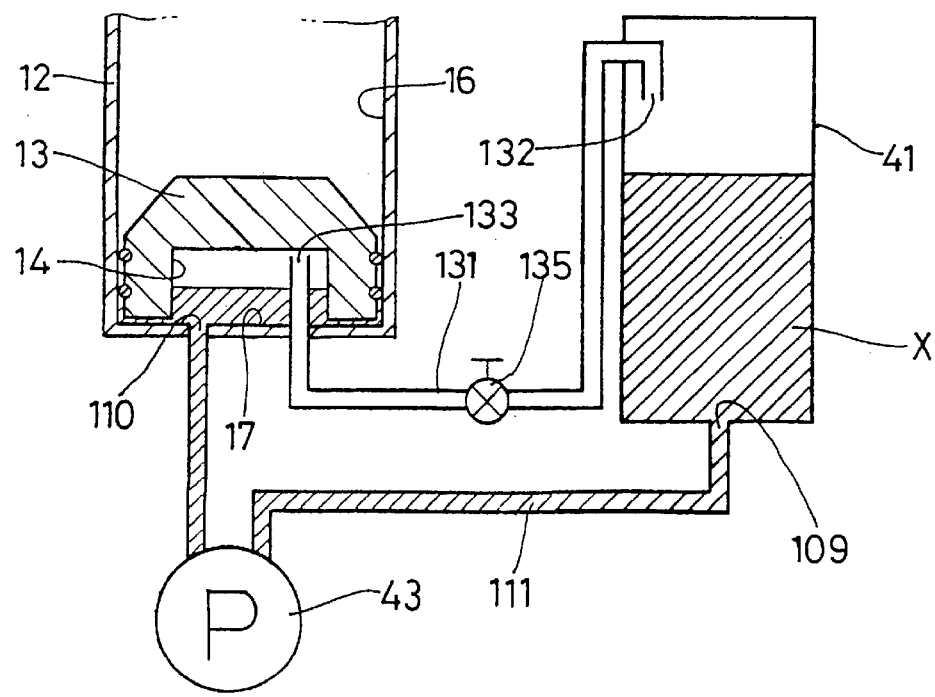
FIG. 23 shows the deflating operation in the ice cream dispenser of a fourteenth embodiment in accordance with the invention.

FIG. 23 illustrates a fourteenth embodiment which is a modified form of the twelfth embodiment. The outlet 132 of the air removing pipe 131 faces the interior of the brine tank 41 from an upper side of the tank. The other construction of the ice cream dispenser of the fourteenth embodiment is the same as that in the twelfth embodiment and accordingly, the same effect can be achieved from the fourteenth embodiment as from the twelfth embodiment.

Figure 24:
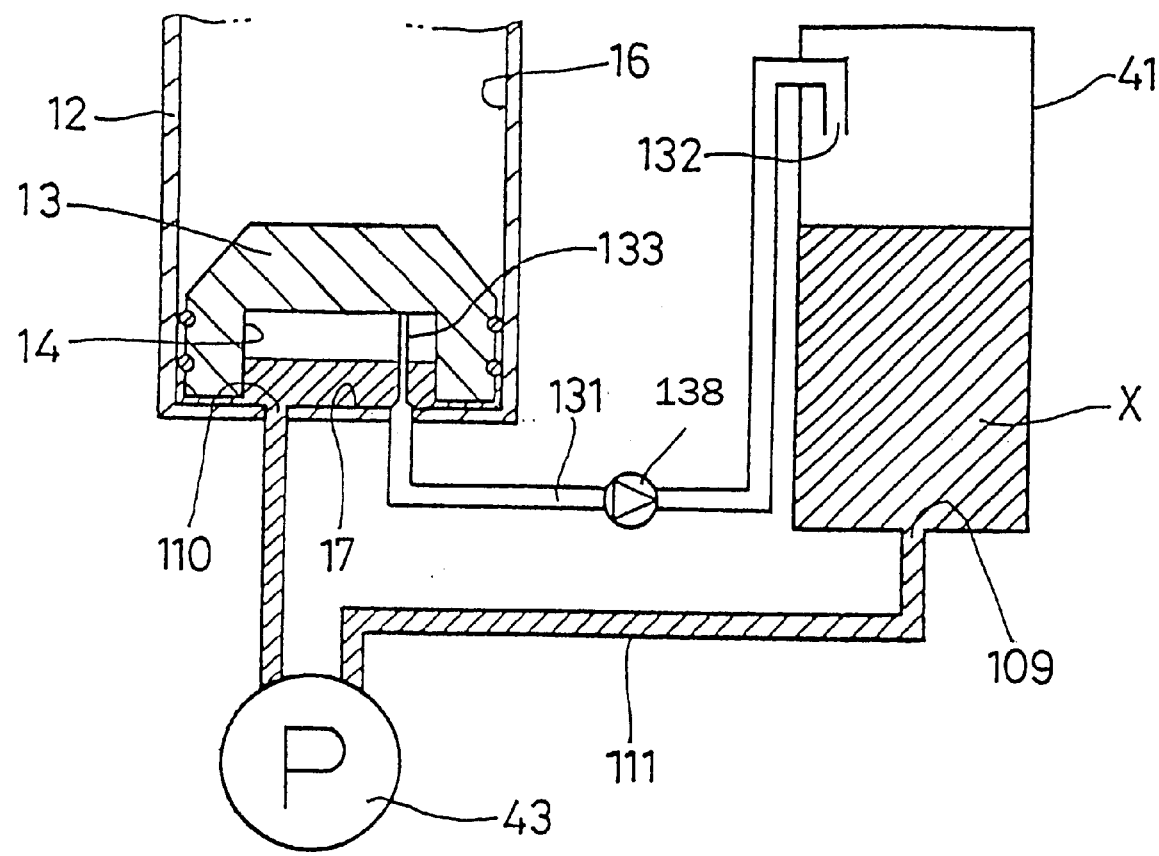
FIG. 24 shows the deflating operation in the ice cream dispenser of a fifteenth embodiment in accordance with the invention.

FIG. 24 illustrates a fifteenth embodiment which is a modified form of the thirteenth embodiment. In the fifteenth embodiment, the air removing pipe 131 which is the same as that in the twelfth embodiment has the outlet 132 facing the interior of the brine tank 41 from an upper side of the tank. A check valve 138 is provided in the middle of the air removing pipe 131 to prevent air from being sucked from the brine tank 41 side into the pressure chamber 17 when the piston 13 is descended.

FIGS. 25A and 25B illustrate a sixteenth embodiment. In the sixteenth embodiment, the piston 13 has in the top thereof, a central screw hole 141 extending to the recess 14. A screw-like cork 142 is provided to be engageable with the screw hole 141. When the frozen dessert dispenser is operated for the first time after installation, the cork 142 is detached so that the screw hole 141 is opened as shown in FIG. 25A. Then, the brine X is supplied to the pressure chamber 17 side. With this, the remaining air is sucked through the air removing pipe 131 to the interior of the cylinder at the side of the top of the piston 13. Then, as shown in FIG. 25B, the cork 142 is thrust into the screw hole 141 so as to close it when the supplied brine X reaches the screw hole 141. As a result, the pressure chamber 17 is filled only with the brine X. When the brine X is supplied into the pressure chamber 17 thereafter, the piston 13 is normally subjected to the pressure of the brine X whereby the piston 13 can reliably ascend and a stable dispensing operation can be carried out. Even during normal operation, the air can be sucked out of the pressure chamber 17 at the time of replacement of pack B.

Figure 26:
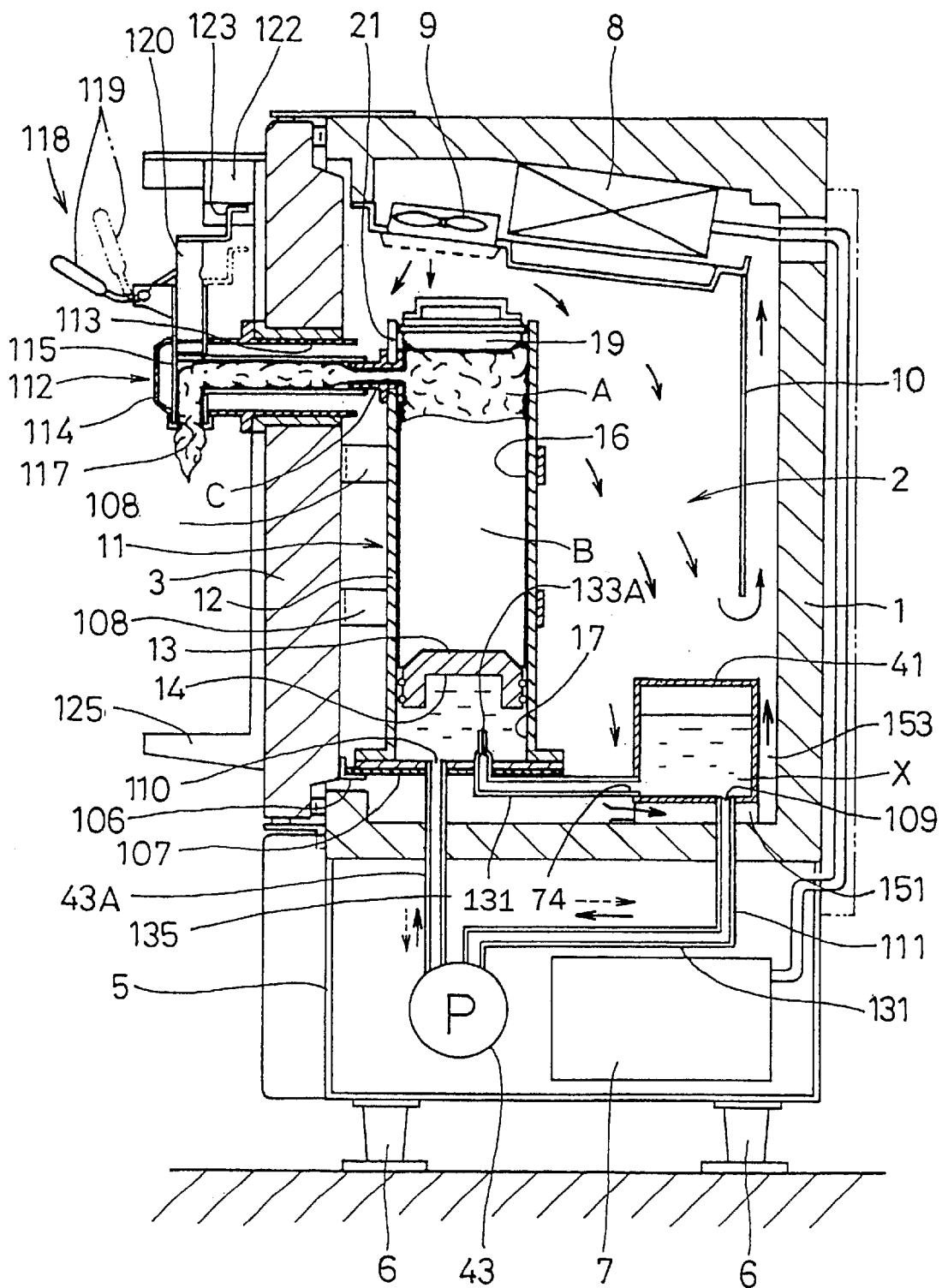
FIG. 26 is a longitudinal sectional view of the ice cream dispenser of a seventeenth embodiment in accordance with the invention.
Figure 27:
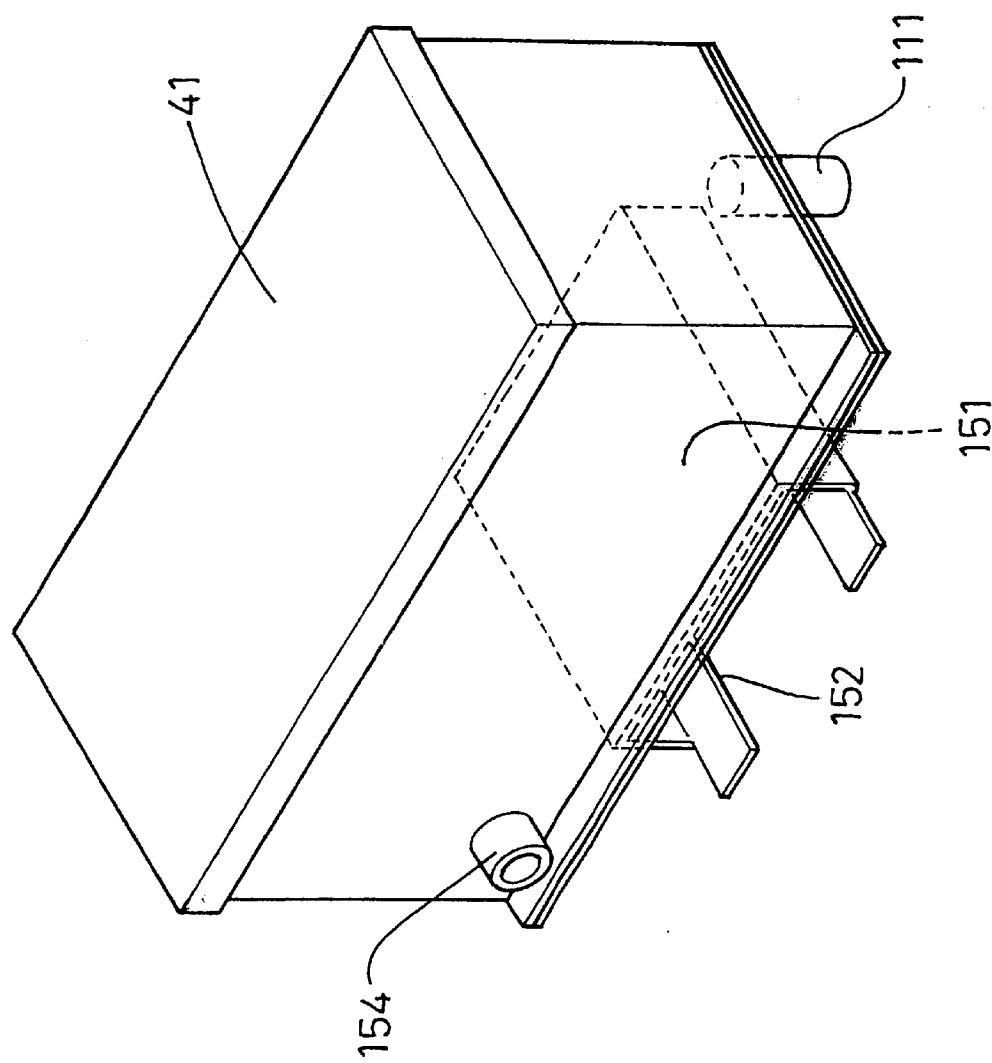
FIG. 27 is a perspective view of a brine tank.

FIGS. 26 and 27 illustrate a seventeenth embodiment. The brine tank 41 reserving the brine X has a leg assembly 151 on the underside thereof. The leg assembly 151 is formed into the shape of a groove. As shown in FIG. 27, the leg assembly 151 is mounted on the central underside of the brine tank 41 so as to extend in a direction of the depth of the brine tank with an opening groove 152 being directed downward. Accordingly, the brine tank 41 is disposed to be spaced away from the bottom of the freezing compartment 2. A predetermined clearance 153 is also defined between a rear wall of the brine tank 41 and a rear wall of the freezing compartment 2.

The air removing pipe 131 connects the pressure chamber 17 of the dispensing cylinder 11 and the brine tank 41. The air removing pipe 131 has an inlet 133A with a reduced diameter as that in the thirteenth embodiment. The air removing pipe 131 extends along the bottom side of the freezing compartment 2 and the other end thereof is connected to a connecting port 74 provided in the front of the brine tank 41. The air removing pipe 131 performs the same function as that in the thirteenth embodiment described above. The other construction of the ice cream dispenser of the seventeenth embodiment is the same as that of the twelfth embodiment.

In the seventeenth embodiment, the brine tank 41 reserving the brine X is disposed so as to rise from the bottom of the freezing compartment 2 by the provision of the leg assembly 151. Further, the clearance 153 is also defined between the rear wall of the brine tank 41 and the rear wall of the freezing compartment 2. Accordingly, when the interior fan 9 supplies cold air into the freezing compartment 2, part of the cold air flows from the front of the brine tank 41 through the bottom and the rear thereof into the duct 10 as shown by arrows in FIG. 26. Consequently, heat exchange efficiently takes place between the brine X in the brine tank 41 and the cold air flowing along all the sides of the brine tank. Further, the air removing pipe 131 is disposed in the freezing compartment 2 without extending through the machine compartment 5. Consequently, the loss of cold of the brine X can also be restrained.

Accordingly, the brine X is cooled to the level substantially equal to the temperature in the freezing compartment 2. When the brine X is supplied to the pressure chamber 17 during the dispensing operation, the quality of the ice cream A in the pack B can reliably be prevented from being deteriorated by the heat of the brine X.

Figure 28:
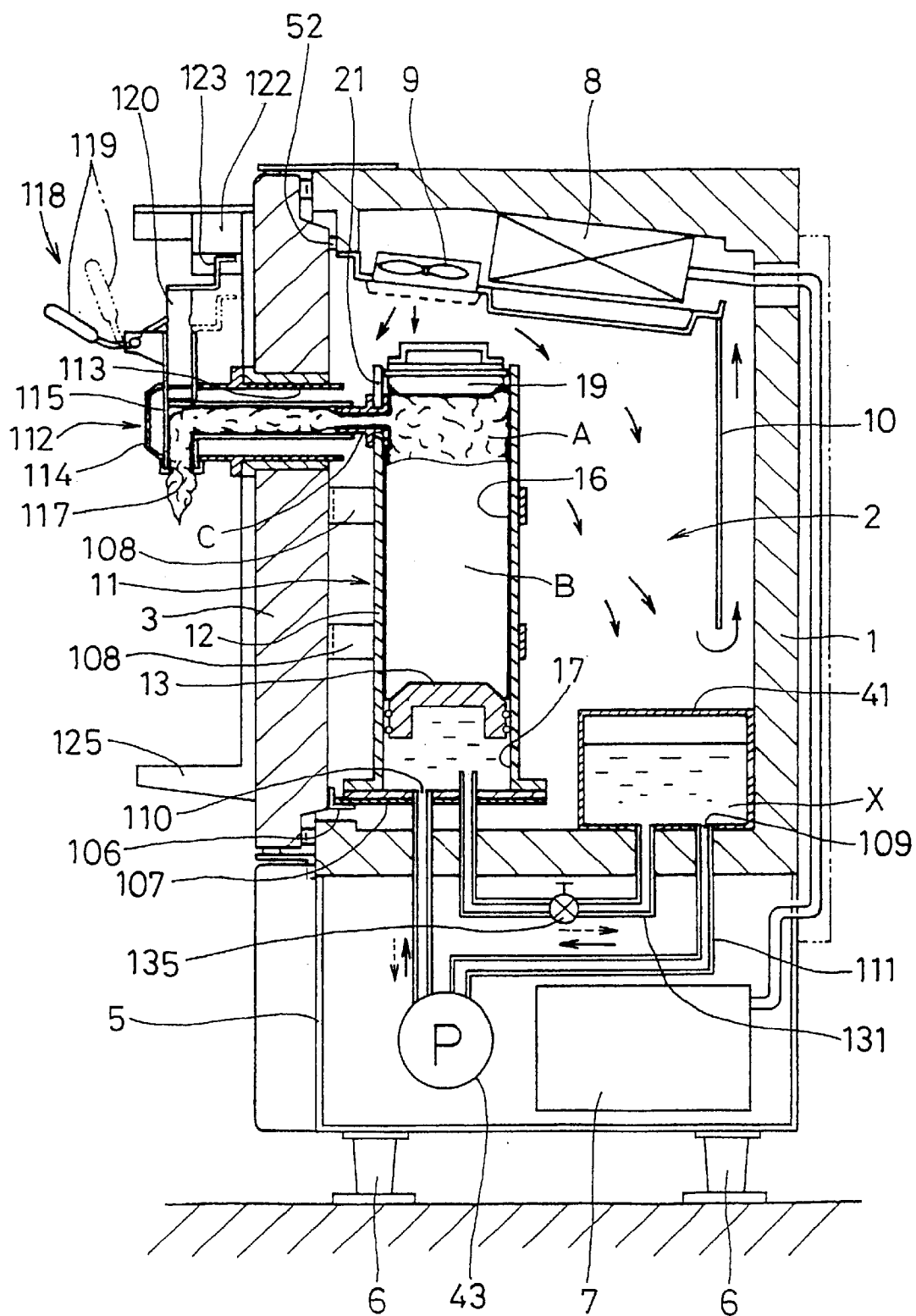
FIG. 28 is a longitudinal sectional view of the ice cream dispenser of an eighteenth embodiment in accordance with the invention.
Figure 29:
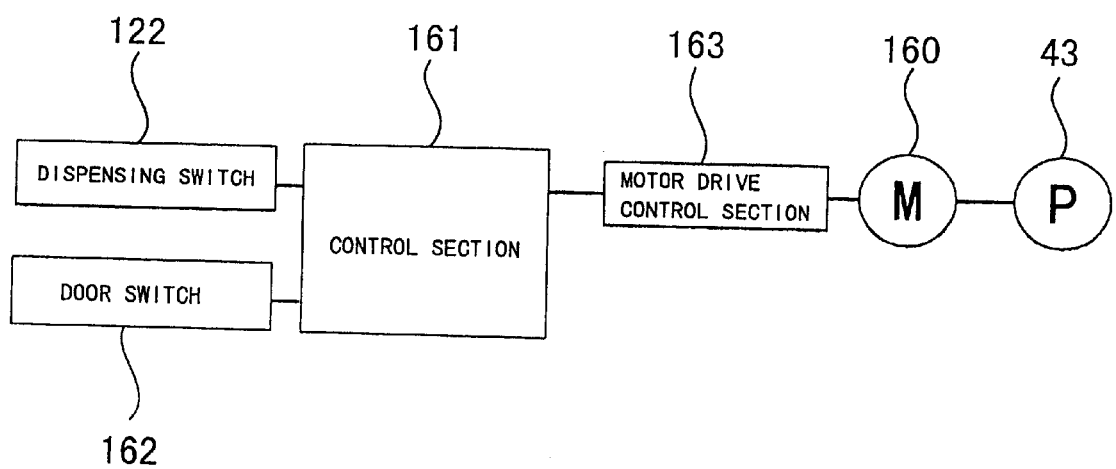
FIG. 29 is a block diagram showing an electrical arrangement of the dispenser.
Figure 30:
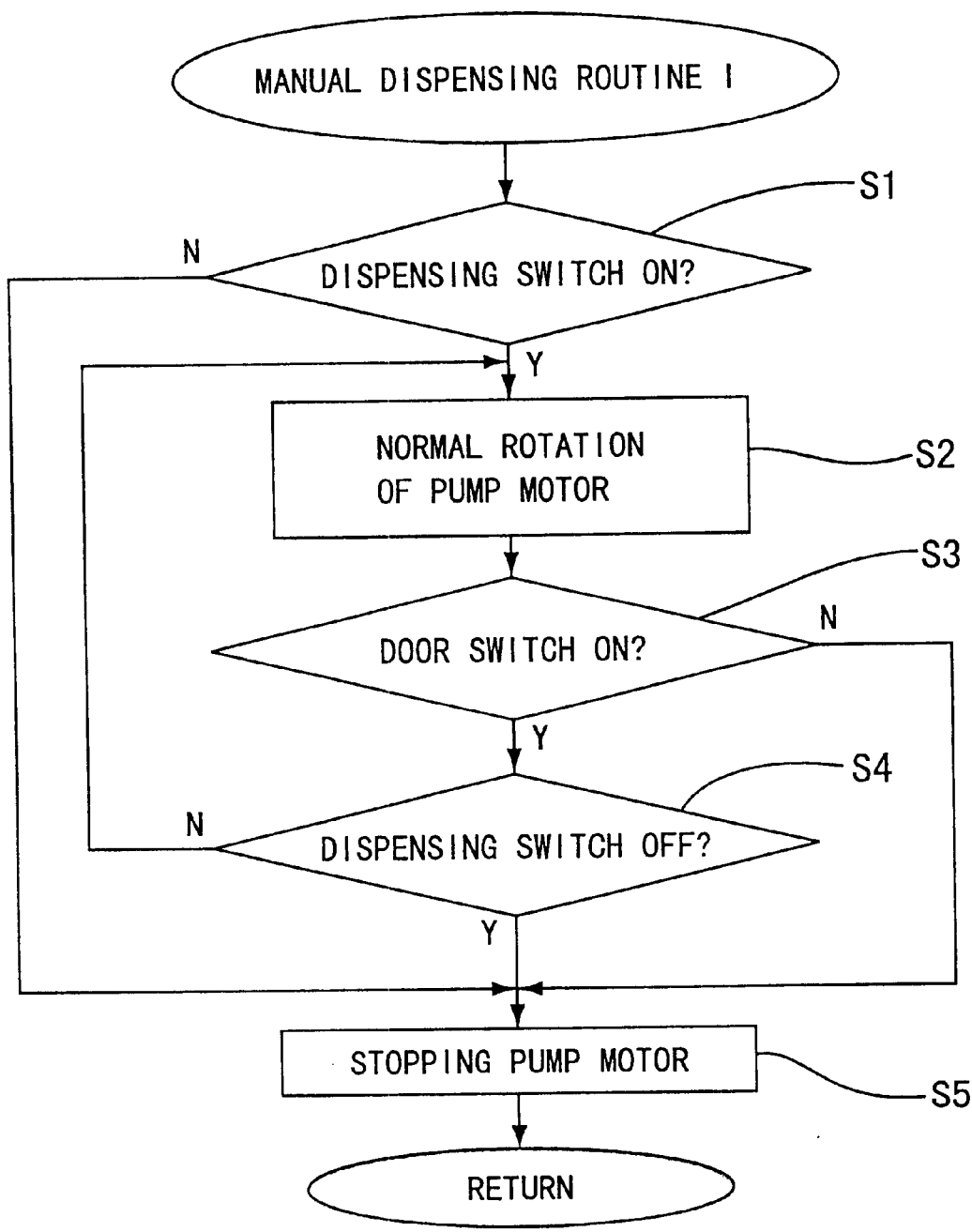
FIG. 30 is a flowchart showing a manual dispensing routine I.

FIGS. 28 to 30 illustrate an eighteenth embodiment. The construction of the ice cream dispenser of the eighteenth embodiment is substantially the same as that of the twelfth embodiment. The similar or identical parts in the eighteenth embodiment are labeled by the same reference symbols as in the twelfth embodiment and accordingly, the description of these parts are eliminated.

The ice cream dispenser of the eighteenth embodiment is provided with means for stopping the supply of the brine X when the heat-insulating door 3 is opened during the dispensing operation. For this purpose, a control section 161 comprising a microcomputer is provided as shown in FIG. 29. Further, a door switch 162 is provided on the upper edge of the front opening of the freezing compartment 2 as shown in FIG. 28. The door switch 162 is turned on when the heat-insulating door 3 is normally closed. The door switch 162 is turned off when the door 3 remains open. The door switch 162 is connected to an input side of the control section 161 with the above-described dispensing switch 122. A pump motor 160 is connected via a pump control circuit 163 to an output side of the control section 161.

In operation, the control section 161 carries out a manual dispensing routine I shown as the flowchart of FIG. 30. When the ice cream A is to be dispensed, the vessel (not shown) is placed on the support plate 125. The lever 119 of the dispensing cock 118 is rotated to the solid line position in FIG. 28 so that the dispensing opening 117 is opened. Since the dispensing switch 122 is simultaneously turned on, the control section 161 determines in the affirmative at step S1 in FIG. 30. The control section 161 then advances to step S2 to rotate the pump motor 160 in the normal direction so that the pump 43 is driven in the normal direction. The control section 161 further advances to step S3 to determine whether the door switch 162 has been turned on. When the heat-insulating door 3 is normally closed, the control section 161 determines in the affirmative at step S3. The control section 161 then advances to step S4 to determine whether the dispensing switch 122 has been turned off. The normal rotation of the pump motor 160 is continued until the control section 161 determines in the affirmative at step S4. Then, the brine X in the brine tank 41 is pumped up to be supplied into the pressure chamber 17 of the dispensing cylinder 11 as shown by solid line arrows in FIG. 28 and pressurized. As a result, since the piston 13 is ascended so that the pack B is compressed, the ice cream A is caused to flow through the supply opening C out of the pack B. The ice cream A is dispensed through the dispensing opening 117 into the vessel. The lever 119 of the dispensing cock 118 is rotated to the chain line position in FIG. 28 when a suitable amount of ice cream A is dispensed out. The dispensing switch 122 is then turned off such that the control section 161 determines in the affirmative at step S4. The control section 161 then advances to step S5 to stop the pump motor 160 and accordingly the pump 43, whereupon the dispensing is completed.

When the ice cream A contained in the pack B has been used up, the pack B is replaced by a new one. A pack replacing switch (not shown) is turned on so that the pump 43 is driven in the reverse direction. As a result, the brine X in the pressure chamber 17 is sucked in to be returned into the brine tank 41 as shown by broken line arrows in FIG. 28. Since the pressure in the pressure chamber 17 is rendered negative, the piston 13 is descended such that the capacity of the pack accommodating chamber 16 is increased. With this, the heat-insulating door 3 is opened and the dispensing cylinder 11 is taken out of the freezing compartment 2. The cap 19 is detached and the used pack B is taken out of the cylinder 12. A new pack B is accommodated in the cylinder 12 so that the ice cream A can be re-dispensed.

Assume a case where the cap 19 is not normally closed in the replacement of the pack B. In this case, when the pack B is pressurized by the piston 13 driven by the brine X, the cap 19 is sometimes detached from the cylinder 12 and the supply opening C of the pack B is sometimes detached from the U-shaped groove 21. As a result, the ice cream A would flow out of the pack B through the supply opening C. Further, when the connection between the brine passage 28 and the pressure chamber 17 is loosened, the connected portion of the brine passage 28 would be disconnected such that the brine X would spout out.

In view of the above-described problems, when the door 3 is opened during the normal rotation of the pump motor 160 for the dispensing of the ice cream A, the door switch 162 is turned off and accordingly, the control section 161 determines in the negative (NO) at step S3. The control section 161 then advances to step S5 to stop the pump motor 160 and accordingly the pump 43. In other words, the pressurizing operation is stopped immediately when the door 3 is opened during the dispensing operation. Accordingly, if the door 3 should remain open or the brine passage 28 should be connected improperly, outflow of the ice cream A or spouting of the brine X with the door 3 open can be prevented.

Figure 31:
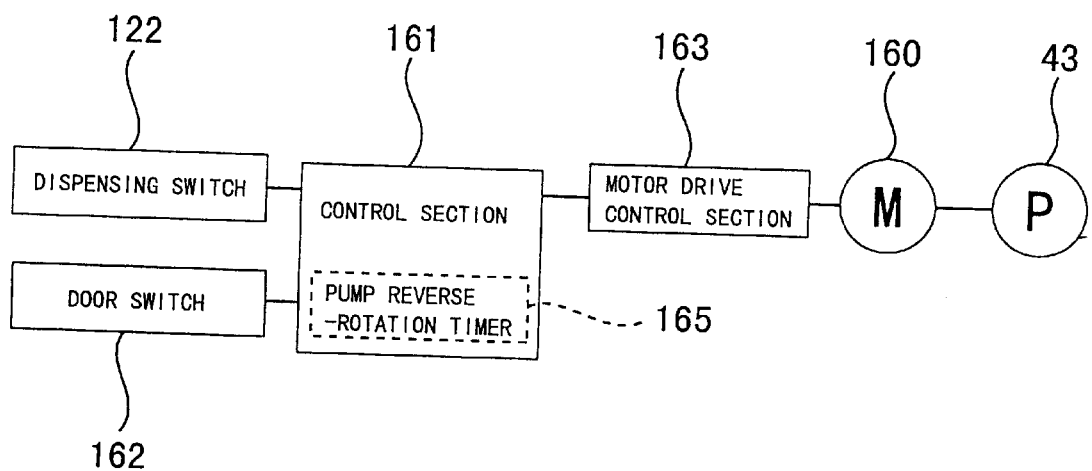
FIG. 31 is a schematic block diagram showing an electrical arrangement of the ice cream dispenser of a nineteenth embodiment in accordance with the invention.
Figure 32:
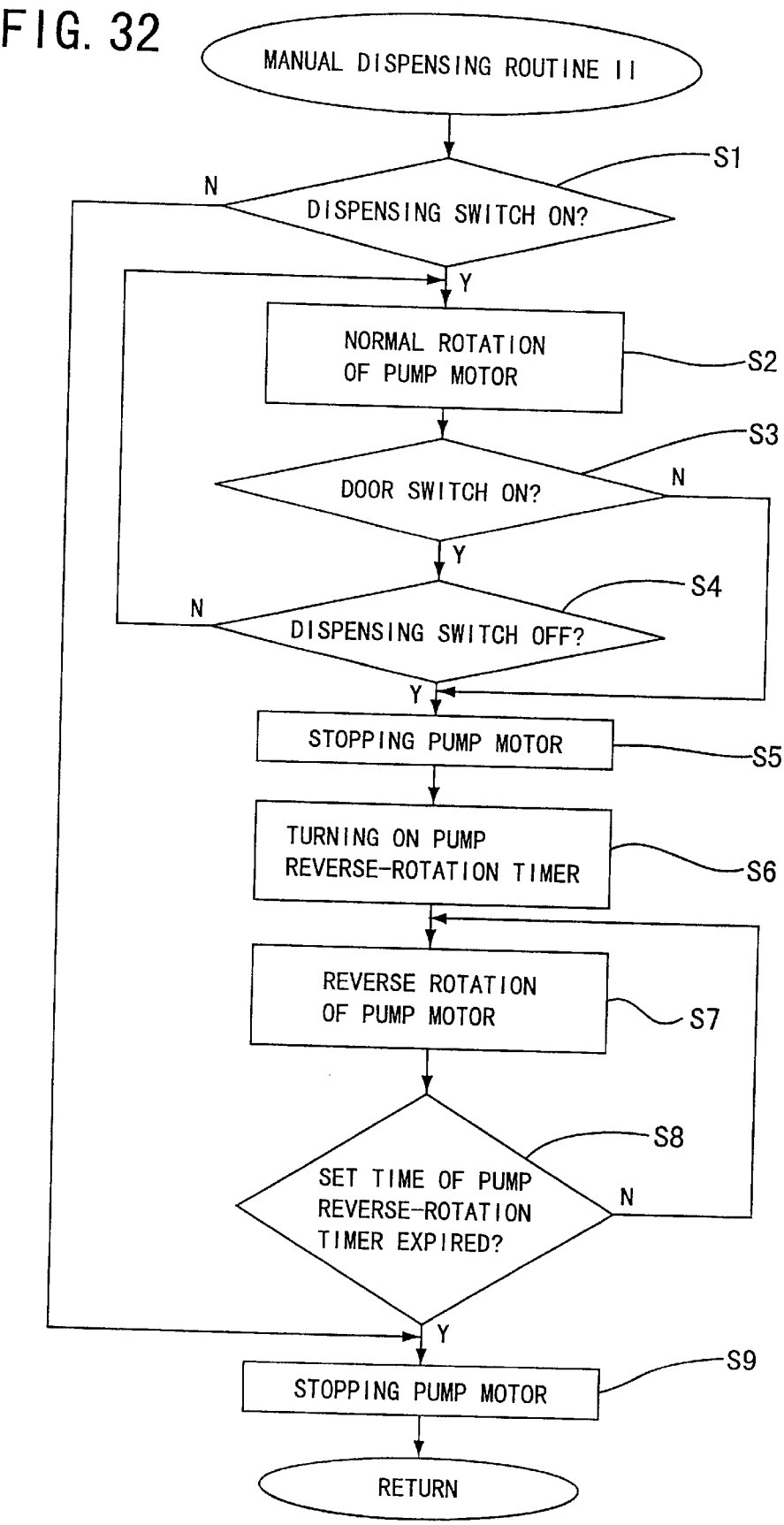
FIG. 32 is a flowchart showing a manual dispensing routine II.

FIGS. 31 and 32 illustrate a nineteenth embodiment. The ice cream dispenser of the nineteenth embodiment is provided with a decompressing function as well as the function of stopping the pressurizing operation immediately when the door 3 is opened during the dispensing operation as described above.

In the nineteenth embodiment, the control section 161 is provided with a pump reverse-rotation timer 165 as shown in FIG. 31. A predetermined time for which the pump motor 160 is rotated in the reverse direction is previously set in the pump reverse-rotation timer 165.

The operation of the ice cream dispenser will be described. The control section 161 carries out a manual dispensing routine II as shown in the flowchart of FIG. 32. The control section 161 carries out steps S1 to S5 in the same manner as in the eighteenth embodiment and the description of these steps are eliminated.

The door switch 162 is turned off when the door 3 is opened during the normal rotation of the pump motor 160 for the dispensing of the ice cream A. Accordingly, the control section 161 determines in the negative at step S3 in FIG. 32. The control section 161 then advances to step S5 to stop the pump motor 160 and accordingly the pump 43. With this, the control section 161 advances to step S6 to start the pump reverse-rotation timer 165. The control section 161 further advances to step S7 to rotate the motor 160 in the reverse direction so that the pump 43 is driven in the reverse direction. Consequently, the brine X in the pressure chamber 17 is sucked to the brine tank 41 side such that the pressure in the pressure chamber 17 is reduced. Upon expiration of a predetermined time, the control section 161 determines in the affirmative at step S8 and advances to step S9 to stop the pump motor 160 and accordingly the pump 43.

In the nineteenth embodiment, when the door 3 is opened during the dispensing operation, the pressurizing operation is immediately stopped and the pump 43 is driven in the reverse direction successively so that the decompressing operation is performed. Consequently, outflow of the ice cream A or spouting of the brine X with the door 3 open can reliably be prevented. Additionally, when the pump 43 is stopped upon completion of the normal dispensing operation, the pump 43 is successively driven in the reverse direction for a predetermined time so that the brine X is sucked out of the pressure chamber 17, whereupon a residual pressure is eliminated from the pressure chamber 17.

Figure 33:
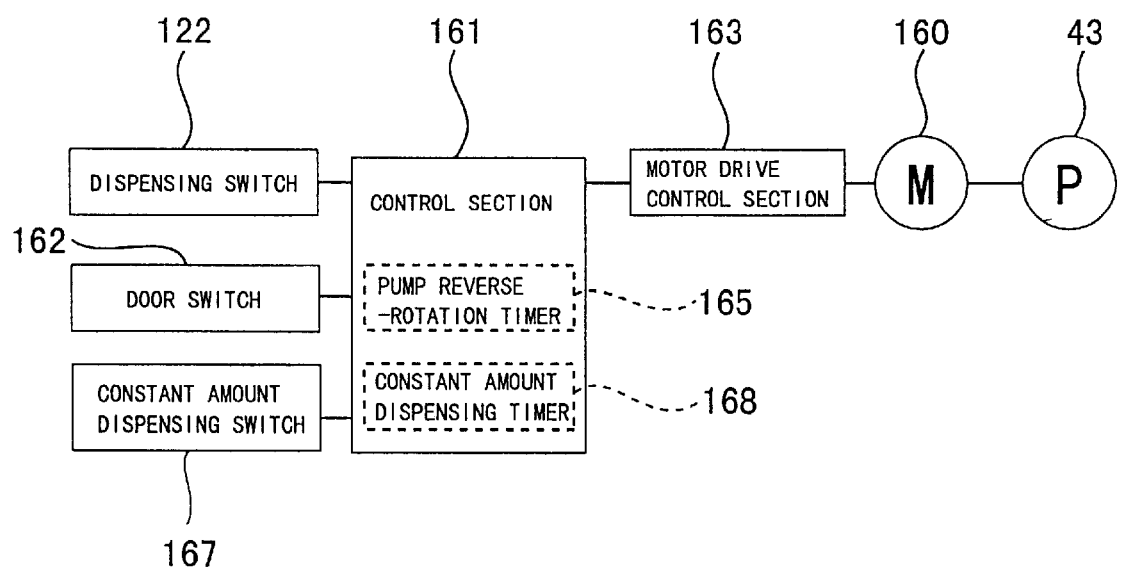
FIG. 33 is a schematic block diagram showing an electrical arrangement of the ice cream dispenser of a twentieth embodiment in accordance with the invention.
Figure 34:
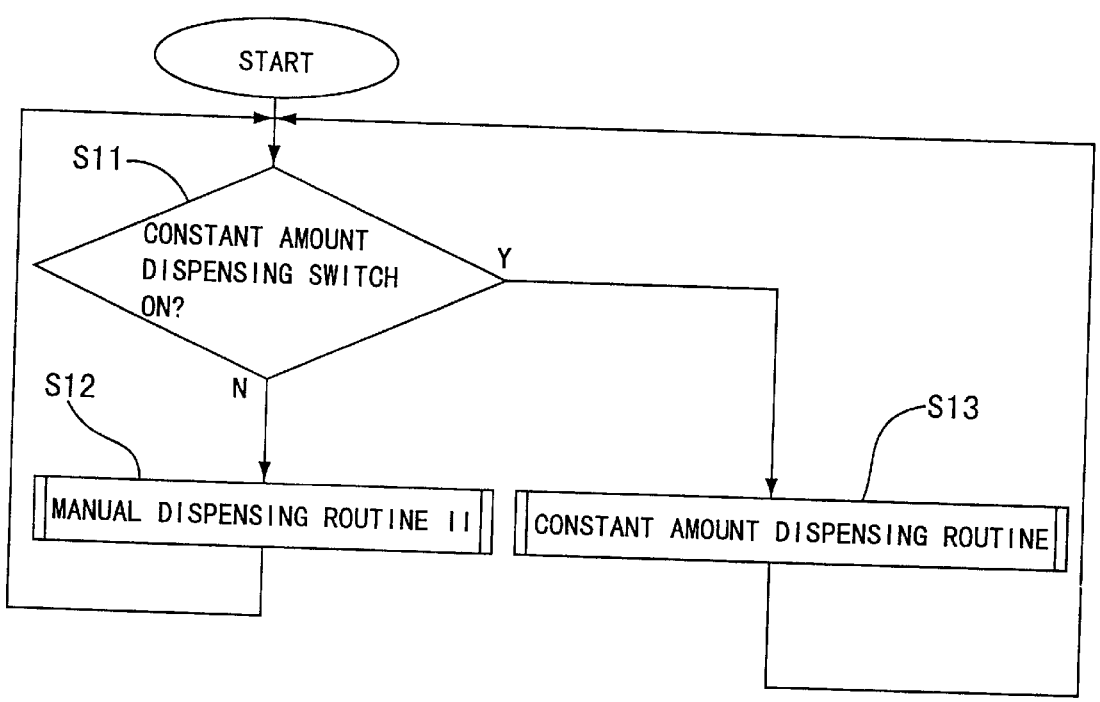
FIG. 34 is a flowchart showing a main routine.
Figure 35:
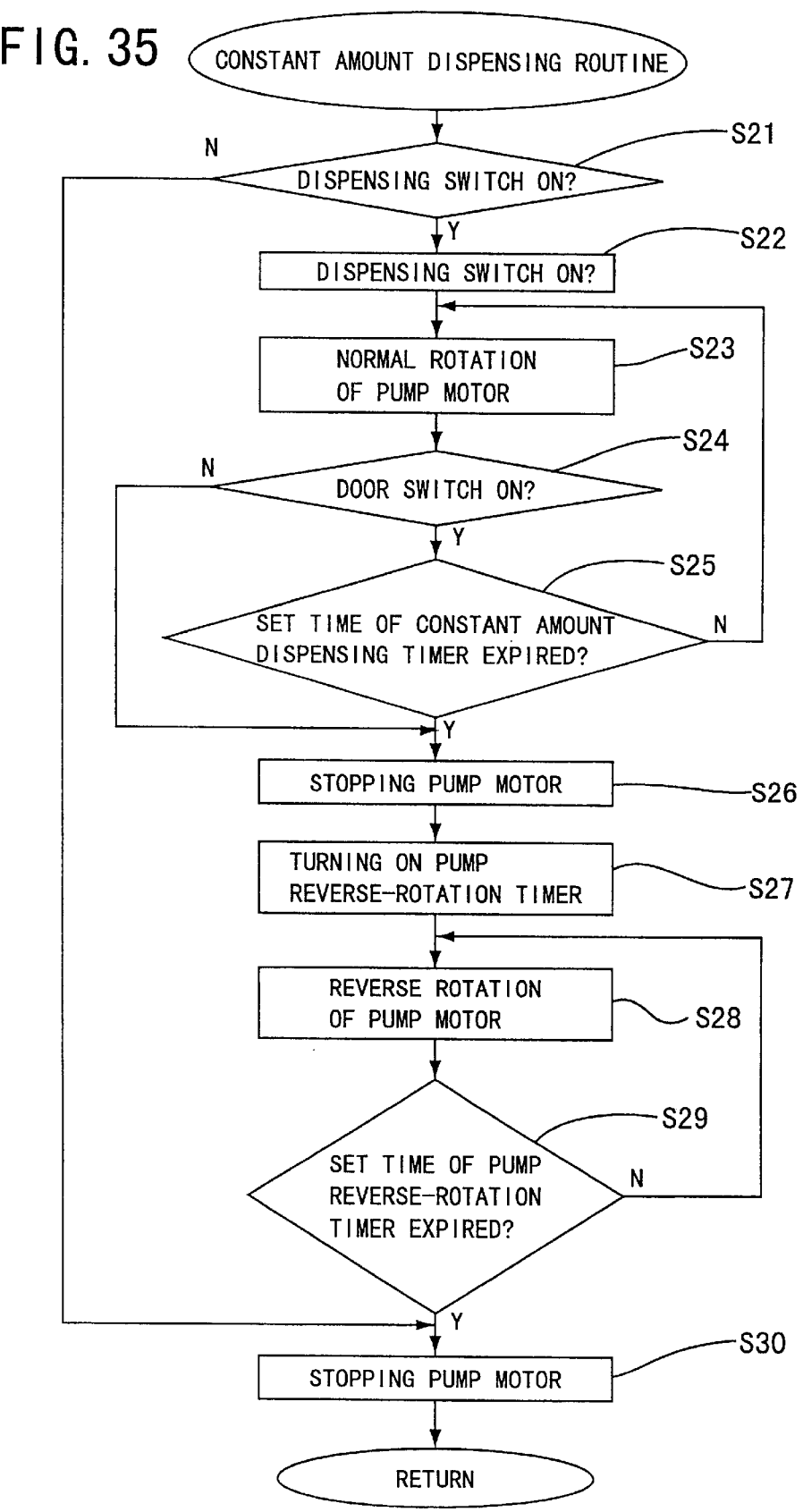
FIG. 35 is flowchart showing a constant amount dispensing routine.

FIGS. 33 to 35 illustrate a twentieth embodiment. In the embodiment, the invention is applied to an ice cream dispenser with a switching function of switching an operation mode between a manual dispensing mode and a constant amount dispensing mode.

A constant amount dispensing switch 167 (see FIG. 33) is provided on an operation panel (not shown) provided on the front etc. of the heat-insulating door 3. Dispensing of a constant amount of ice cream A is carried out when the constant amount dispensing switch 167 is turned on, whereas manual dispensing of ice cream A is carried out when the constant amount dispensing switch 167 is turned off. The constant amount dispensing switch 167 is connected to the input side of the control section 161 together with the door switch 162 and the dispensing switch 122 linked to the dispensing cock 118 as shown in FIG. 35. Further, the control section 161 is provided with a constant amount dispensing timer 168 as well as with the above-described pump reverse-rotation timer 165. A time for which the pump motor 160 is rotated in the normal direction is set in the constant amount dispensing timer 168. The dispensing switch 122 functions as a trigger for the dispensing of a constant amount of ice cream A.

The operation of the ice cream dispenser will now be described. The control section 161 carries out programs as shown in the flowcharts of FIGS. 34 and 35 respectively. FIG. 34 shows a main routine. At step S11, the control section 161 determines whether the constant amount dispensing switch 167 is turned on. When the constant amount dispensing switch 167 is turned off, the control section 161 determines in the negative at step S11. The control section 161 then advances to step S12 to carry out the manual dispensing routine II. The manual dispensing routine II is the same as that described in the eighteenth embodiment and accordingly, the description thereof is eliminated. In the twentieth embodiment, too, when the heat-insulating door 3 is opened during the dispensing operation, the pressurizing operation is immediately stopped and successively, the pump 43 is rotated in the reverse direction so that the decompressing operation is carried out.

On the other hand, the control section 161 determines in the affirmative at step S11 when the constant amount dispensing switch 167 is turned on. The control section 161 then advances to step S13 to carry out the constant amount dispensing routine as shown by the flowchart of FIG. 35. More specifically, the dispensing switch 122 is turned on when the dispensing cock 118 is opened. The control section 161 determines in the affirmative at step S21. The control section 161 advances to step S22 to start the constant amount dispensing timer 168 and further to step S23 to rotate the pump motor 160 in the normal direction so that the pump 43 is driven in the normal direction. At step S24, the control section 161 determines whether the door switch 162 is turned on. When the door 3 is normally closed, the control section 161 determines in the affirmative at step S24. The control section 161 then advances to step S25. The normal rotation of the pump motor 160 is continued until the control section 161 determines at step S25 that the dispensing time has expired. The brine X in the brine tank 41 is supplied into the pressure chamber 17 of the dispensing cylinder 11 so that the pressure in the chamber is increased, whereby the ice cream A is dispensed through the dispensing opening 117 into the vessel.

The door switch 162 is turned off when the door 3 is opened during the dispensing operation. Accordingly, the control section 161 determines in the negative at step S24, advancing to step S26 to stop the pump motor 160 and accordingly the pump 43. Thereafter, the control section 161 advances to step S27 to start the pump reverse-rotation timer 165 and further to step S28 to rotate the pump motor 160 in the reverse direction so that the pump 43 is driven in the reverse direction. Consequently, the brine X in the pressure chamber 17 is sucked in to the brine tank 41 side such that the pressure in the chamber is reduced. Upon expiration of a predetermined time, the control section 161 determines in the affirmative at step S29, then advancing to step S30 to stop the pump motor 160 and accordingly the pump 43.

When the door 3 is opened during the constant amount dispensing operation, too, the pressurizing operation is immediately stopped and the pump 43 is driven in the reverse direction successively so that the decompressing operation is performed. Additionally, when the pump 43 is stopped upon completion of the normal constant amount dispensing operation, the pump 43 is successively driven in the reverse direction for a predetermined time so that the brine X is sucked out of the pressure chamber 17, whereupon a residual pressure is eliminated from the pressure chamber 17.

In each of the foregoing embodiments, the pump is driven in the normal and reverse directions so that the operating fluid is supplied to and sucked in from the pressure chamber respectively. However, a pump may be driven only in one direction and a brine passage may be switched between a forward way and a backward way by means of an electromagnetic valve. Further, the ice cream includes both of a soft ice cream and a hard ice cream. Additionally, the invention may be applied to dispensers for dispensing other frozen desserts such as yogurt or sherbet.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A frozen dessert dispenser comprising:
   a heat-insulating box having a side formed with an opening;
   a heat-insulating door mounted on the heat-insulating box, the heat-insulating door capable of opening and closing the heat-insulating box opening;
   a cooling unit for cooling an atmosphere in the heat-insulating box;
   a dispensing cylinder having an open end, a lid for closing and opening the open end thereof, and a piston provided therein for sliding motion, the cylinder including a pack accommodating chamber defined between the piston and the lid therein so that a frozen dessert pack can be accommodated in the pack accommodating chamber when the lid is open;
   a pump operable to supply and discharge an operating fluid to and from a pressure chamber defined in the dispensing cylinder, the pressure chamber being located in a space opposite the pack accommodating chamber with respect to the piston; and
   a normally closed operating fluid introducing port provided in the cylinder, the operating fluid introducing port being opened when the piston reaches a bottom dead point, so that the operating fluid can be introduced therethrough into the pressure chamber.

2. A frozen dessert dispenser comprising:
   a heat-insulating box having a side formed with an opening;
   a heat-insulating door mounted on the heat-insulating box, the heat-insulating door capable of opening and closing the heat-insulating box opening;
   a cooling unit for cooling an atmosphere in the heat-insulating box;
   a dispensing cylinder having an open end, a lid for closing an opening the open end thereof, and a piston provided therein for sliding motion, the cylinder including a pack accommodating chamber defined between the piston and the lid so that a frozen dessert pack can be accommodated in the pack accommodating chamber when the lid is open;
   a pump operable to supply and discharge an operating fluid to and from a pressure chamber defined in the dispensing cylinder, the pressure chamber being located in a space opposite the pack accommodating chamber with respect to the piston;
   a piston detecting switch operable to detect when the piston reaches a bottom dead point thereof, and to deliver a signal indicative thereof; and
   a drive control circuit for stopping an operation of the pump based on the signal delivered from the piston detecting switch, said drive control circuit comprising a first circuit set with a predetermined abnormal condition determining time which is slightly longer than a time required for the piston to be moved from a top dead point to a bottom dead point, and a second circuit operable to stop the pump upon expiration of the abnormal condition determining time set in the first circuit after the piston starts descending.

3. A frozen dessert dispenser comprising:
   a heat-insulating box having a side formed with an opening;
   a heat-insulating door mounted on the heat-insulating box, the heat-insulating door capable of opening and closing the heat-insulating box opening;
   a cooling unit for cooling an atmosphere in the heat-insulating box;
   a dispensing cylinder having an open end, a lid for closing an opening the open end thereof, and a piston provided therein for sliding motion, the cylinder including a pack accommodating chamber defined between the piston and the lid so that a frozen dessert pack can be accommodated in the pack accommodating chamber when the lid is open;
   a brine tank provided in the heat-insulating box to hold an operating liquid;
   a brine supply pipe connecting the brine tank and a pressure chamber defined in the dispensing cylinder, the pressure chamber being located opposite the pack accommodating chamber relative to the piston;
   a pump provided in the brine supply pipe for supplying and discharging the operating liquid into and from the pressure chamber;
   an auxiliary passage connecting the pressure chamber of the dispensing cylinder and the brine tank;
   a check valve provided in the auxiliary passage so as to allow the operating liquid to flow from the brine tank to the pressure chamber and to prevent a reverse flow of the operating fluid; and
   a valve provided in the auxiliary passage in series with the check valve, the valve being capable of being opened when the piston reaches a bottom dead point, the valve being closed otherwise.

4. The frozen dessert dispenser according to claim 3, wherein the valve includes an actuator provided in a bottom of the dispensing cylinder, the actuator being located so as to be depressed by the piston when the piston reaches the bottom dead point, thereby opening the valve.

* * * * *